United States Patent
Saiki et al.

(10) Patent No.: US 7,507,928 B2
(45) Date of Patent: Mar. 24, 2009

(54) OPERATING DEVICE AND METHOD OF MANUFACTURE THEREOF

(75) Inventors: Jun Saiki, Osaka (JP); Shuji Yamashita, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/024,446

(22) Filed: Feb. 1, 2008

(65) Prior Publication Data
US 2008/0185277 A1 Aug. 7, 2008

(30) Foreign Application Priority Data
Feb. 2, 2007 (JP) .............................. 2007-024651

(51) Int. Cl.
*H01H 19/14* (2006.01)
(52) U.S. Cl. .................... 200/564; 200/11 R; 200/11 J; 200/567
(58) Field of Classification Search ............... 200/11 R, 200/11 A, 11 D, 11 DA, 11 J, 11 TW, 564, 200/565, 567–569, 571, 336
See application file for complete search history.

(56) References Cited

U.S. PATENT DOCUMENTS

| | | | | |
|---|---|---|---|---|
| 3,207,860 A | * | 9/1965 | Korsgren, Jr. et al. | 200/7 |
| 3,819,883 A | * | 6/1974 | Heap | 200/11 J |
| 3,892,931 A | * | 7/1975 | Lockard | 200/11 R |
| 4,320,267 A | * | 3/1982 | Greve et al. | 200/4 |
| 6,642,459 B2 | * | 11/2003 | Chou et al. | 200/11 TW |
| 6,680,444 B1 | * | 1/2004 | Lee | 200/4 |

FOREIGN PATENT DOCUMENTS

| | | |
|---|---|---|
| JP | 4-36710 | 2/1992 |
| JP | 10-20178 | 1/1998 |
| JP | 2006-72165 | 3/2006 |

* cited by examiner

*Primary Examiner*—Michael A Friedhofer
(74) *Attorney, Agent, or Firm*—Hamre, Schumann, Mueller & Larson, P.C.

(57) ABSTRACT

The operating device includes a first holder that holds a zoom lever so as to be rotatable, a return spring that energizes the zoom lever in the rotation direction, and a second holder that holds the return spring and is held within the zoom lever, wherein the first holder supports the return spring while causing the return spring to undergo elastic deformation. Such a configuration makes it possible to distribute the load placed on the stopper during operation, thereby preventing an operating member or the stopper from breaking.

7 Claims, 24 Drawing Sheets

OPERATING DEVICE AND METHOD OF MANUFACTURE THEREOF

BACKGROUND OF THE INVENTION

1. Field of the Invention

The present invention relates to an operating device provided in a variety of electronic devices, and particularly relates to an operating device that involves rotation or swiveling operations.

2. Description of Related Art

Operating devices for performing zoom operations are provided in digital still cameras, which have quickly become common in recent years. Such operating devices for performing zoom operations can be divided broadly into two categories: those that use the manipulation of a rotating switch or a sliding switch provided in the main body of the camera to electronically move a zoom lens in the direction of the optical axis; and those that use the rotation of a rotatable zoom lever or zoom ring provided coaxial to the lens barrel in the lens barrel itself to move a zoom lens mechanically in the direction of the optical axis. An example of the configuration of the latter is disclosed in Patent Document 1 (JP H10-20178A).

For example, the stated rotating switch is energized by a spring or the like so as to always return to a neutral position, and can be rotated from the neutral position in two different directions. Rotating the rotating switch in one direction can cause the camera to zoom out, while rotating the rotating switch in the other direction can cause the camera to zoom in. A stopper means regulates the rotation of the rotating switch to a certain degree of rotation (a rotational end) in the stated one or other directions.

If the stated rotating switch is rotated with excessive force and reaches the rotational end, a heavy load is exerted upon the stopper means, and there is the possibility that the rotating switch or the stopper means will break as a result. A configuration in which stopper means are formed at plural points, thereby distributing the load, can be considered as a way to prevent such breakage.

Patent Document 1, Patent Document 2 (JP 2006-72165A), and Patent Document 3 (JP H4-36710A) disclose configurations in which stopper means, which regulate the rotational position of a zoom ring (operating member), are formed at plural points.

However, due to variations in the dimensional accuracies of the operating member and stopper means, the configurations disclosed in Patent Documents 1 through 3 cannot guarantee that the load will be distributed equally among the stopper means when the operating member is manipulated as far as the rotational end. If there are variations in the dimensional accuracies of the operating member and the stopper means, there is a problem in that the load will be concentrated on a single one of the plural stopper means, leading to the possibility that the operating member or the stopper means will break.

SUMMARY OF THE INVENTION

Therefore, with the foregoing in mind, it is an object of the present invention to provide an operating device that can distribute the load placed on stopper means during operation, thereby preventing an operating member or the stopper means from breaking. It is also an object of the present invention to provide a method of manufacture for such an operating device.

The operating device according to the present invention is provided with a rotational operating member that can be rotated within a predetermined angular range, and comprises: a first holder that holds the rotational operating member so as to be rotatable; an elastic member that energizes the rotational operating member in the rotation direction; and a second holder that holds the elastic member and is held within the rotational operating member, wherein the first holder supports the elastic member while causing the elastic member to undergo elastic deformation.

In a manufacture method for assembling an operating device and mounting the operating device in a device according to the present invention, the operating device comprises a rotational operating member that can be rotated within a predetermined angular range, a first holder that holds the rotational operating member so as to be rotatable, an elastic member that energizes the rotational operating member in the rotation direction, and a second holder that holds the elastic member and is held within the rotational operating member; and the manufacture method comprises the steps of creating a pre-prepared member by causing the elastic member to be held by the second holder, mounting the first holder to the device, mounting the rotational operating member to the first holder, and mounting the pre-prepared member to the rotational operating member, wherein part of the elastic member is mounted to the first holder when mounting the pre-prepared member to the rotational operating member.

According to the present invention, the load placed upon contact surfaces during operation can be distributed among plural contact surfaces, thereby preventing the rotational operating member, first holder, and so on from breaking, becoming detached, and so on.

Furthermore, the elastic member easily can be incorporated into the rotational operating member, improving the ease of assembly.

DETAILED DESCRIPTION OF THE INVENTION

Hereinafter, the present invention will be described by way of illustrative embodiments with reference to the drawings.

Embodiment 1

[1. Configuration of Device Provided with Operating Device]

Figure 1:
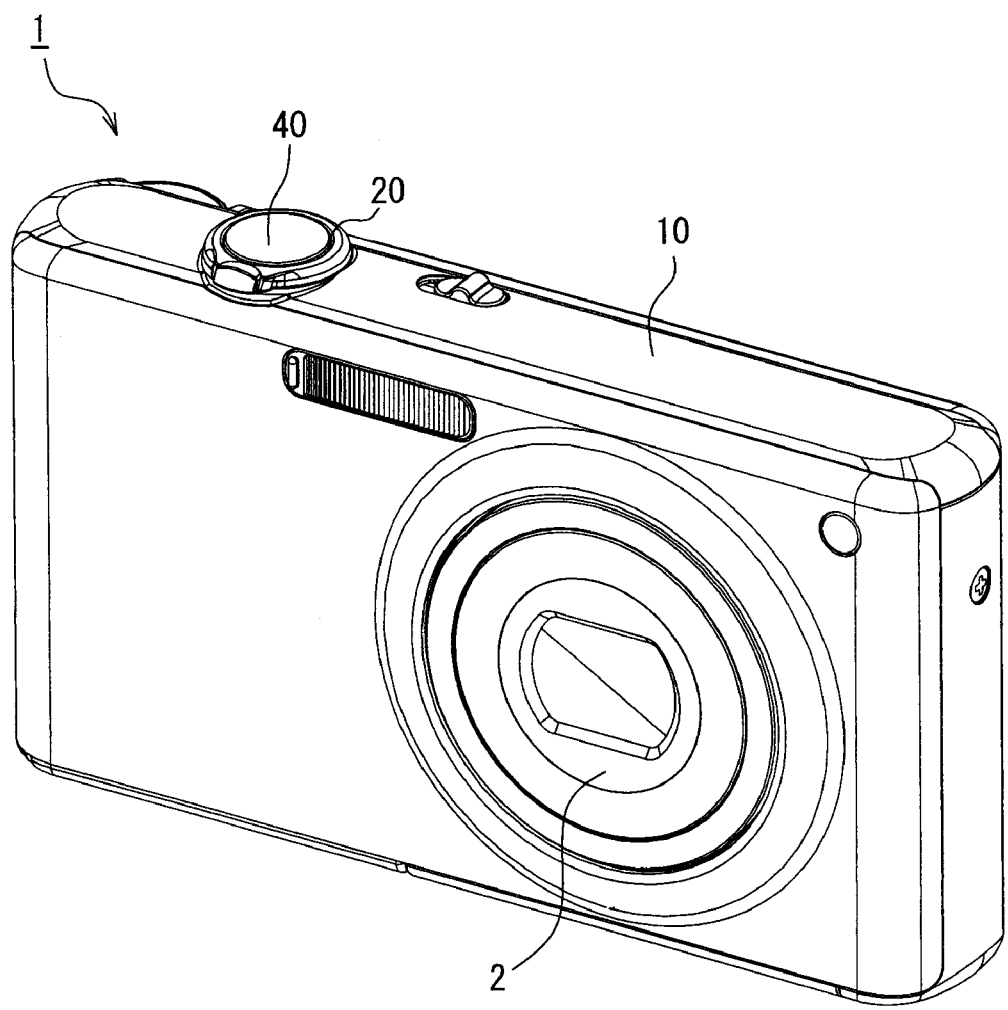
FIG. 1 is a perspective view illustrating the outer appearance of a digital still camera.
Figure 2:
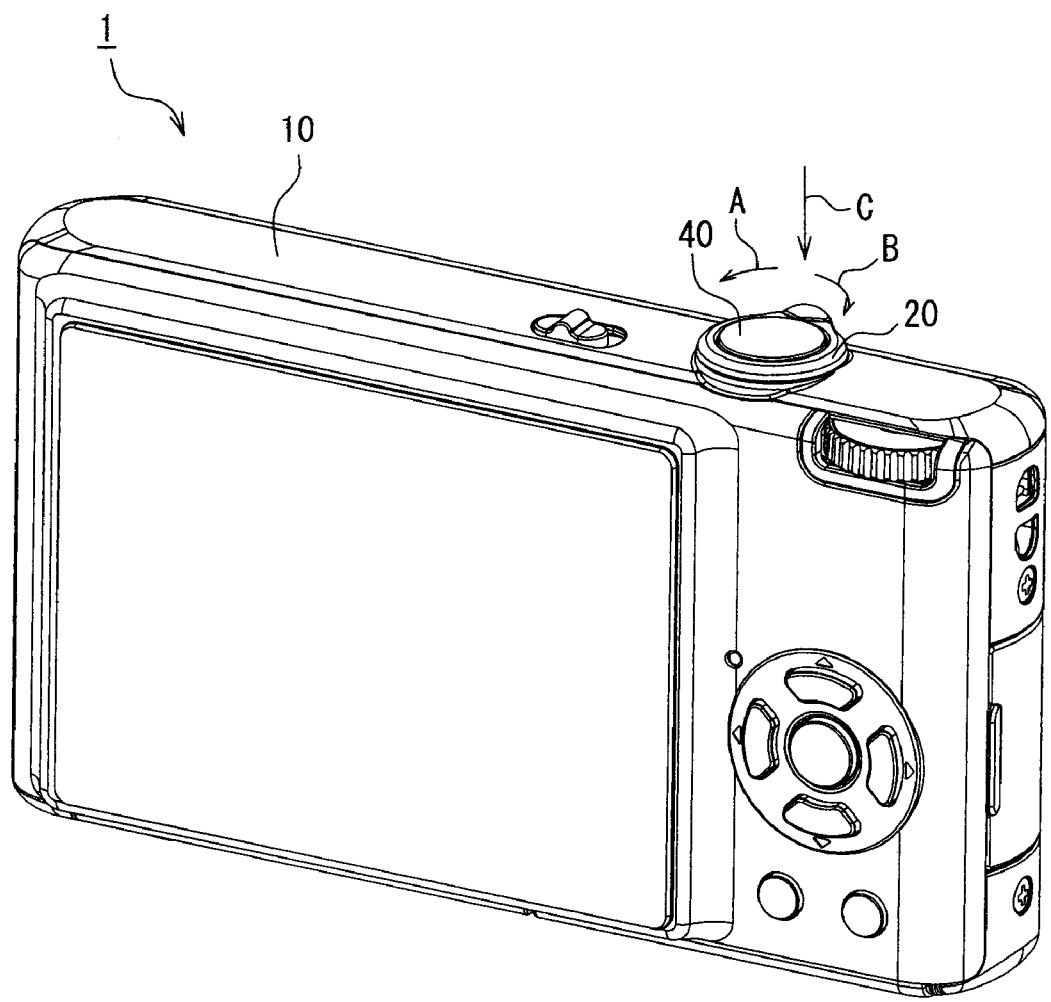
FIG. 2 is a perspective view illustrating the outer appearance of a digital still camera.

FIG. 1 is a perspective view illustrating the outer appearance of a device provided with an operating device according to embodiment 1, and is a diagram showing the device viewed from the front side. FIG. 2 is a perspective view of the device of FIG. 1 viewed from the back side. While in the present embodiment an imaging device (digital still camera) is given as an example of the device provided with the operating device, the operating device can be implemented in other devices as well.

As shown in FIGS. 1 and 2, a lens unit 2 is disposed in the front surface of a camera body 1. At least a zoom lens is provided within the lens unit 2 so as to be movable in the direction of the optical axis. Furthermore, a zoom lever 20 and a release button 40 are provided in an upper cover 10, which covers the upper surface of the camera body 1.

The zoom lever 20 (rotational operating member) is formed in an approximately circular shape, with an opening provided therein, and is disposed in such a way as to be rotatable in the directions indicated by arrows A or B. Optical zooming, where an optical image is enlarged or reduced by moving the zoom lens disposed within the lens unit 2 in the direction of the optical axis, and electronic zooming, where signal processing is carried out so that an electronic image picked up by an imaging sensor (not shown) is enlarged or reduced, are performed by rotating the zoom lever 20. For example, the image can be enlarged (zoomed in) by rotating the zoom lever 20 in the direction indicated by the arrow B, and can be reduced (zoomed out) by rotating the zoom lever 20 in the direction indicated by the arrow A.

The release button 40 is disposed within the opening of the zoom lever 20, and can be depressed in the direction indicated by arrow C. An image picked up by the imaging sensor can be captured and stored as image data in a storage medium such as a memory card by depressing the release button 40.

[2. Configuration of Operating Device]

Figure 3:
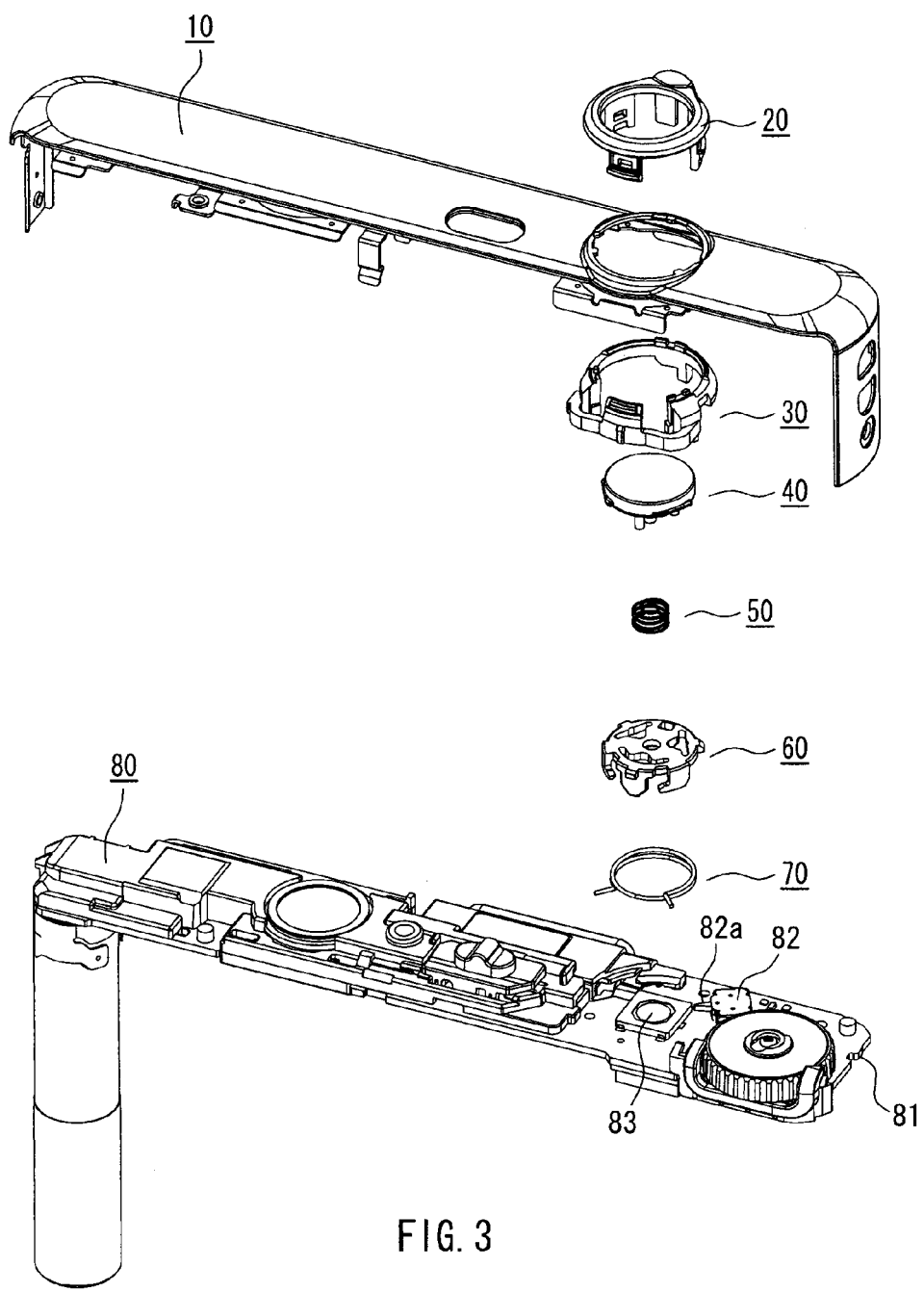
FIG. 3 is an exploded perspective view of an operating device.

FIG. 3 is an exploded perspective view of the operating device according to embodiment 1.

As shown in FIG. 3, the operating device includes the zoom lever 20, a first holder 30, the release button 40, a spring 50, a second holder 60, and a return spring 70. The operating device as configured above is disposed in the upper cover 10. An electric circuit unit 80 is disposed beneath the upper cover 10.

[2-1. Configuration of Electric Circuit Unit 80]

As shown in FIG. 3, the electric circuit unit 80 includes a printed substrate 81, a zoom switch 82, and a release switch 83. The zoom switch 82 and release switch 83 are mounted on the printed substrate 81, along with other electric components.

The zoom switch 82 is configured of a three-point, automatic return-to-center switch, and includes a lever 82a that can be rotated in two different directions respective to a neutral position. When the lever 82a is positioned in the center (the neutral position), zoom operation is in an "off" state; however, when the lever 82a is being tilted in one direction, an instruction for zooming in is being inputted, whereas when the lever 82a is being tilted in the other direction, an instruction for zooming out is being inputted. The lever 82a is interlocked with the zoom lever 20, and is configured so as to be capable of zooming in or zooming out when the zoom lever 20 is rotated in the directions indicated by the arrows A or B (see FIG. 2).

The release switch 83 is configured of a push-button switch, and is switched to an "on" state when the release button 40 is depressed.

[2-2. Configuration of Upper Cover 10]

Figure 4:
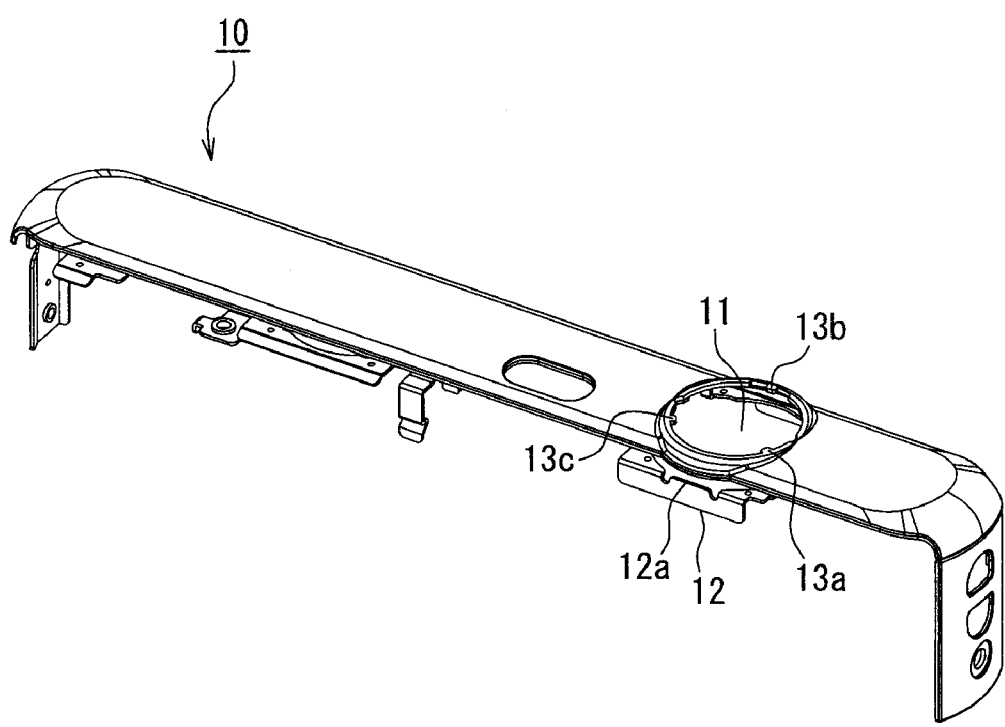
FIG. 4 is a perspective view illustrating the configuration of an upper cover.
Figure 5:
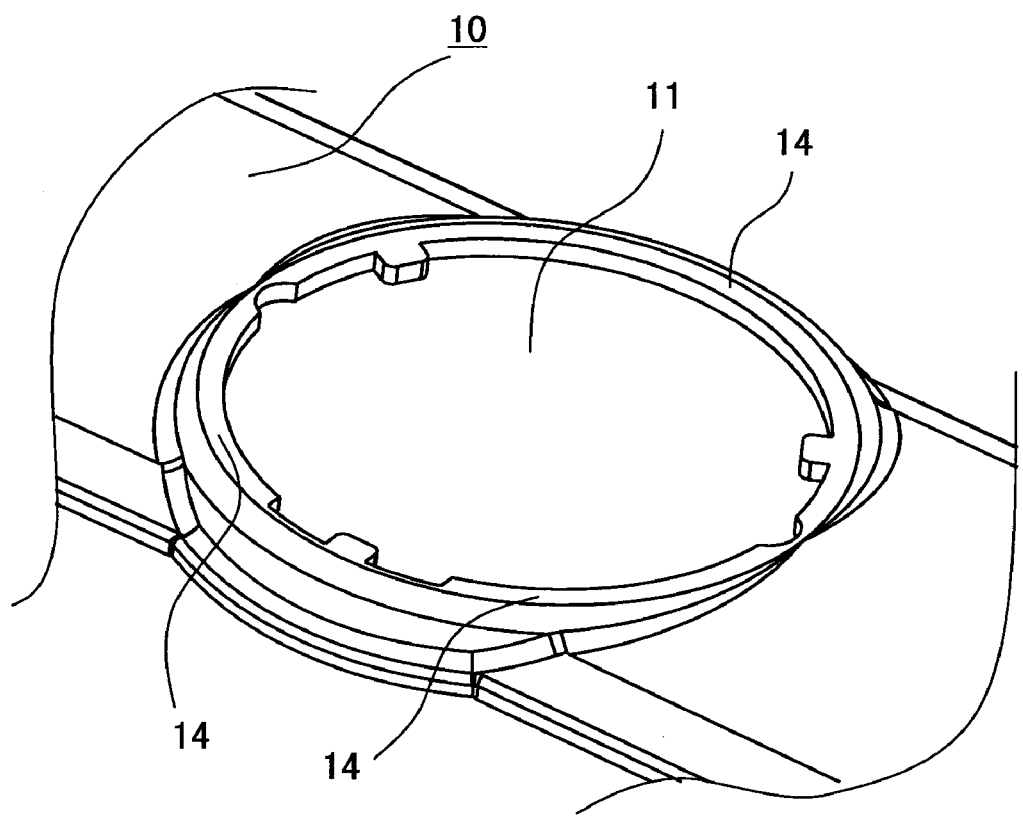
FIG. 5 is a perspective view illustrating the relevant parts of the configuration of the upper cover.
Figure 6:
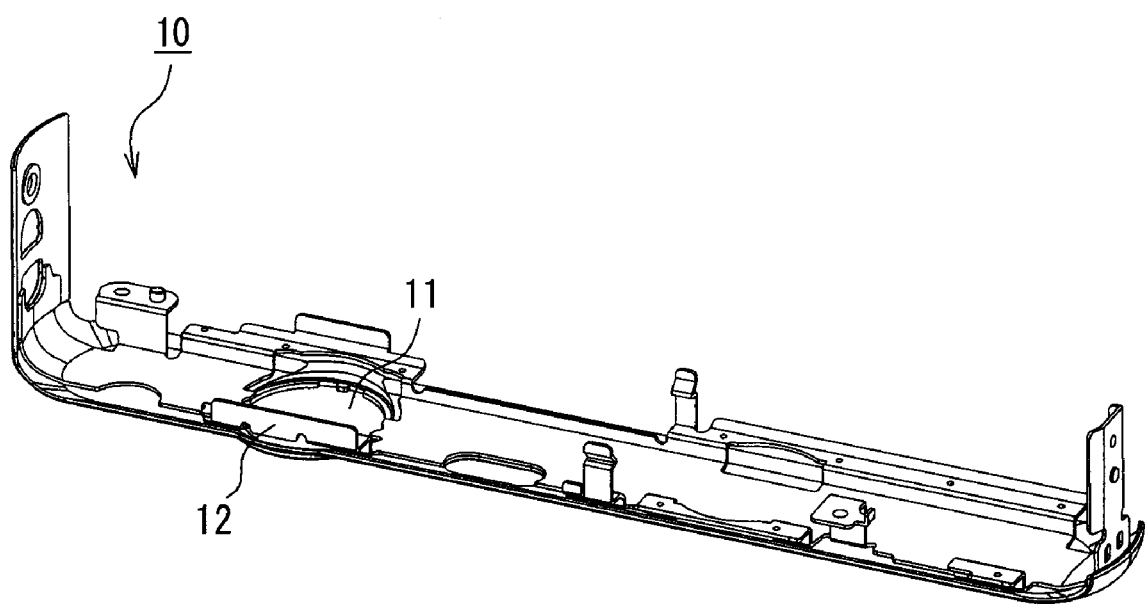
FIG. 6 is a perspective view illustrating the configuration of the upper cover.

FIGS. 4 and 6 are perspective views illustrating the configuration of the upper cover 10. FIG. 4 illustrates an angle from which the top surface of the upper cover 10 can be seen. FIG. 6 illustrates an angle from which the bottom surface of the upper cover 10 can be seen. FIG. 5 is an enlarged view of the area around an opening 11 shown in FIG. 4.

As shown in FIGS. 4 through 6, the upper cover 10 includes the opening 11, a support member 12, protruding portions 13a through 13c, and a sliding surface 14. The opening 11 is formed in an approximately circular shape, and the operating device fits therewithin.

The support member 12 is a metal plate, part of which is bent, disposed on the bottom surface of the upper cover 10, and holds the position of the substrate 81 in the vertical direction. An approximately circular opening is formed in the support member 12, in a position approximately central to the opening 11.

The protruding portions 13a through 13c protrude from the inner side of the opening 11 toward the center of the opening 11. When the first holder 30 is mounted onto the upper cover 10, the protruding portions 13a through 13c interlock with recessed portions 33a through 33c formed in the first holder 30, and thereby serve to position the first holder 30.

The sliding surface 14 is formed around the opening 11, and is a surface on which a sliding surface 26a slides when the zoom lever 20 (described later) is rotated.

[2-3. Configuration of Zoom Lever 20]

Figure 7:
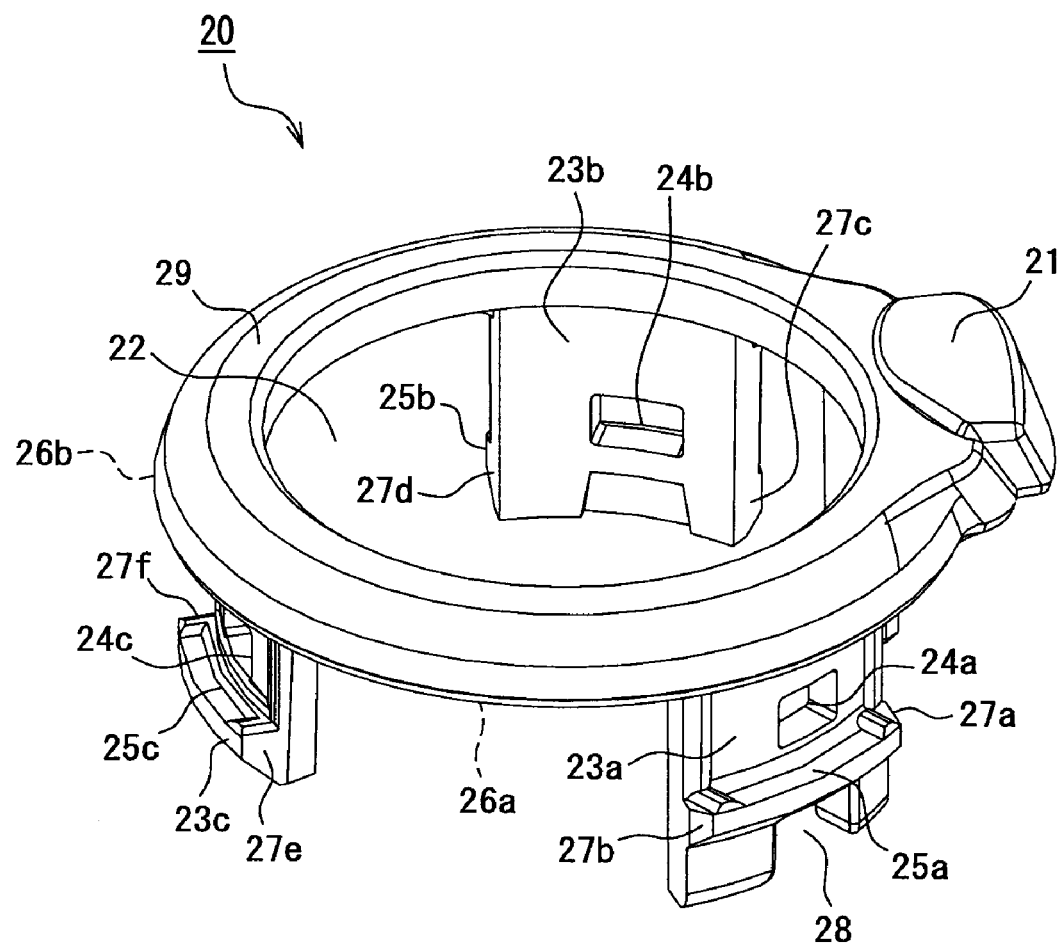
FIG. 7 is a perspective view illustrating the configuration of a zoom lever.
Figure 8:
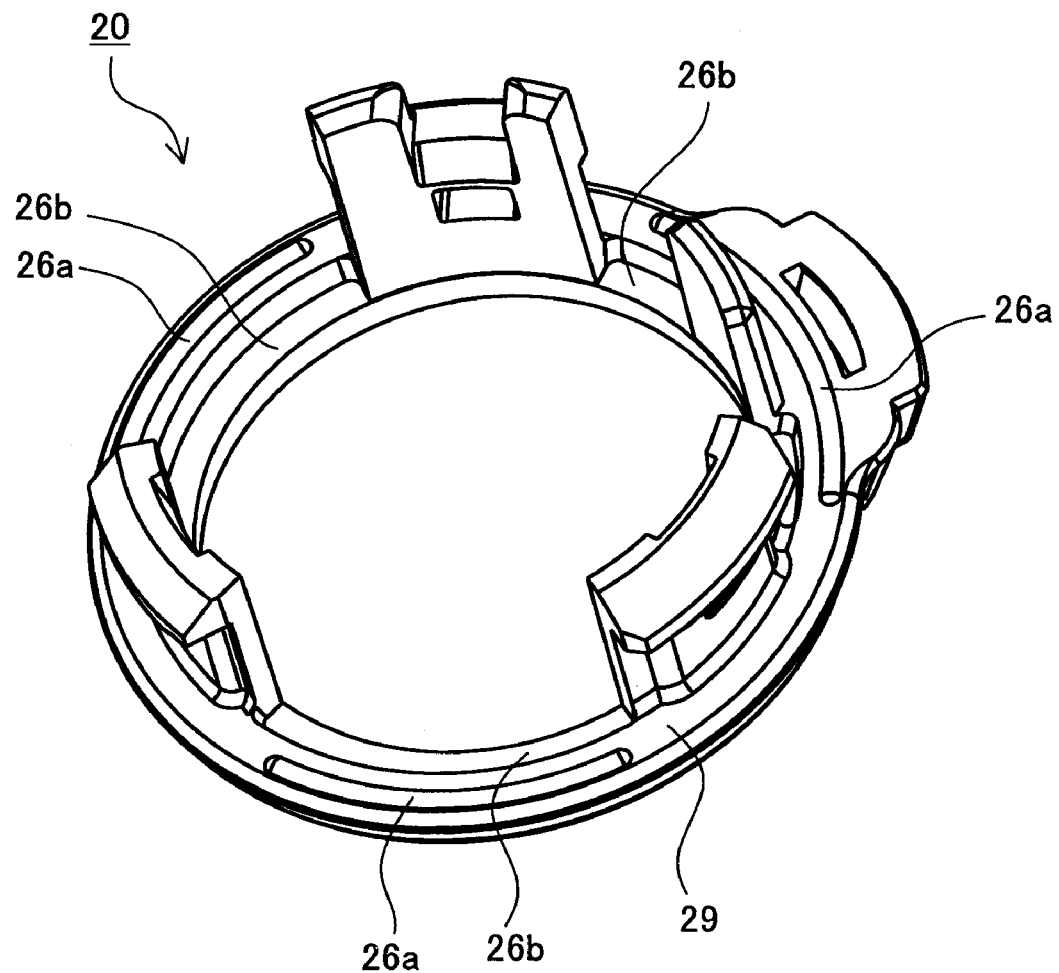
FIG. 8 is a perspective view illustrating the configuration of the zoom lever.

FIG. 7 is a perspective view illustrating the configuration of the zoom lever 20. FIG. 8 is a diagram illustrating the zoom lever 20, as viewed from the bottom surface side. As shown in FIGS. 7 and 8, the zoom lever 20 includes a operating portion 21, an opening 22, support portions 23a through 23c, openings 24a through 24c, engagement portions 25a through 25c, the sliding surface 26a, a limiting surface 26b, contact surfaces 27a through 27f, a recessed portion 28, and a circular member 29. It should be noted that the surface of the circular member 29 that faces the surface of the upper cover 10 when the zoom lever 20 is disposed on the surface of the upper cover 10 is defined as the "bottom surface" of the circular member 29. The surface opposite from this bottom surface is defined as the "top surface" of the circular member 29.

The operating portion 21 is formed protruding from a part of the top surface of the circular member 29. When a user rotates the zoom lever 20 in the directions indicated by the arrows A or B (see FIG. 2), the operating portion 21 can be used to perform the rotation smoothly, by the user hooking his/her index finger or the like thereon.

The opening 22 is formed approximately in the center of the circular member 29. The release button 40 can be fitted within the opening 22.

The support portions 23a through 23c are formed in three places on the bottom surface of the circular member 29, projecting in an approximately vertical direction from the bottom surface. The openings 24a through 24c, engagement portions 25a through 25c, and contact surfaces 27a through 27f are formed in the support portions 23a through 23c.

The openings 24a through 24c are formed so as to pass through the support portions 23a through 23c, respectively. The openings 24a through 24c interlock with protruding portions 66a through 66c, respectively (described later), formed in the second holder 60 (also described later). Note, however, that the openings 24a through 24c do not necessarily have to be formed so as to pass all the way through the support portions 23a through 23c, and instead may be formed so as to provide openings on at least the surface of the support portions 23a through 23c facing the opening 22.

The engagement portions 25a through 25c are formed in the support portions 23a through 23c, respectively, protruding in the outer directions thereof, and have engagement surfaces that face the bottom surface of the circular member 29. When the zoom lever 20 is held by the first holder 30, these engagement surfaces are positioned so as to be facing toward and capable of contact with sliding surfaces 35a through 35c of the first holder 30 (described later). Accordingly, the zoom lever 20 can be held by the first holder 30 so as to be rotatable in the directions indicated by the arrows A or B (see FIG. 2).

As shown in FIG. 8, the sliding surface 26a is equivalent to a line rib surface, and is provided on the bottom surface of the circular member 29. The limiting surface 26b is a surface that forms a downward step relative to the bottom surface of the circular member 29. The sliding surface 26a is arranged so as to face the sliding surface 14 provided in the upper cover 10 (see FIG. 5), and is disposed so as to be slidable relative to the sliding surface 14 provided in the upper cover 10 when the zoom lever 20 is rotated. Furthermore, the limiting surface 26b is disposed facing a flange 44 of the release button 40 (see FIG. 11), and serves to position the release button 40 in the vertical direction.

The contact surfaces 27a and 27b (second contact surfaces) are formed on each end of the engagement portion 25a of the support portion 23a in the lengthwise direction. The contact surfaces 27c and 27d are formed on each end of the engagement portion 25b of the support portion 23b in the lengthwise direction. The contact surfaces 27e and 27f are formed on each end of the engagement portion 25c of the support portion 23c in the lengthwise direction. The lines extending toward the center of the opening 22 from the contact surfaces 27a through 27f are not central to the rotational axis of the zoom lever 20. That is to say, the contact surfaces 27a through 27f are configured so as to be slanted relative to the radial direction of the circular opening 22. The contact surfaces 27a, 27d, and 27e are formed parallel to contact surfaces 34b, 34f, and 34d (described later), respectively, formed in the first holder 30, and these respective contact surfaces make contact with one another when the zoom lever 20 is rotated to the rotational end in one direction. This makes it possible to regulate the position of the rotational end of the zoom lever 20. Furthermore, the contact surfaces 27b, 27c, and 27f are formed parallel to contact surfaces 34c, 34a, and 34e (described later), respectively, formed in the first holder 30, and these respective contact surfaces make contact with one another when the zoom lever 20 is rotated to the rotational end in the other direction. Once again, this makes it possible to regulate the position of the rotational end of the zoom lever 20.

The recessed portion 28 is formed in the lower end of the support portion 23a, and the lever 82a of the zoom switch 82 (see FIG. 3) interlocks therewith. Accordingly, the lever 82a can be switched to one direction or the other direction when the zoom lever 20 is rotated in the directions indicated by the arrows A or B.

[2-4. Configuration of First Holder 30]

Figure 9:
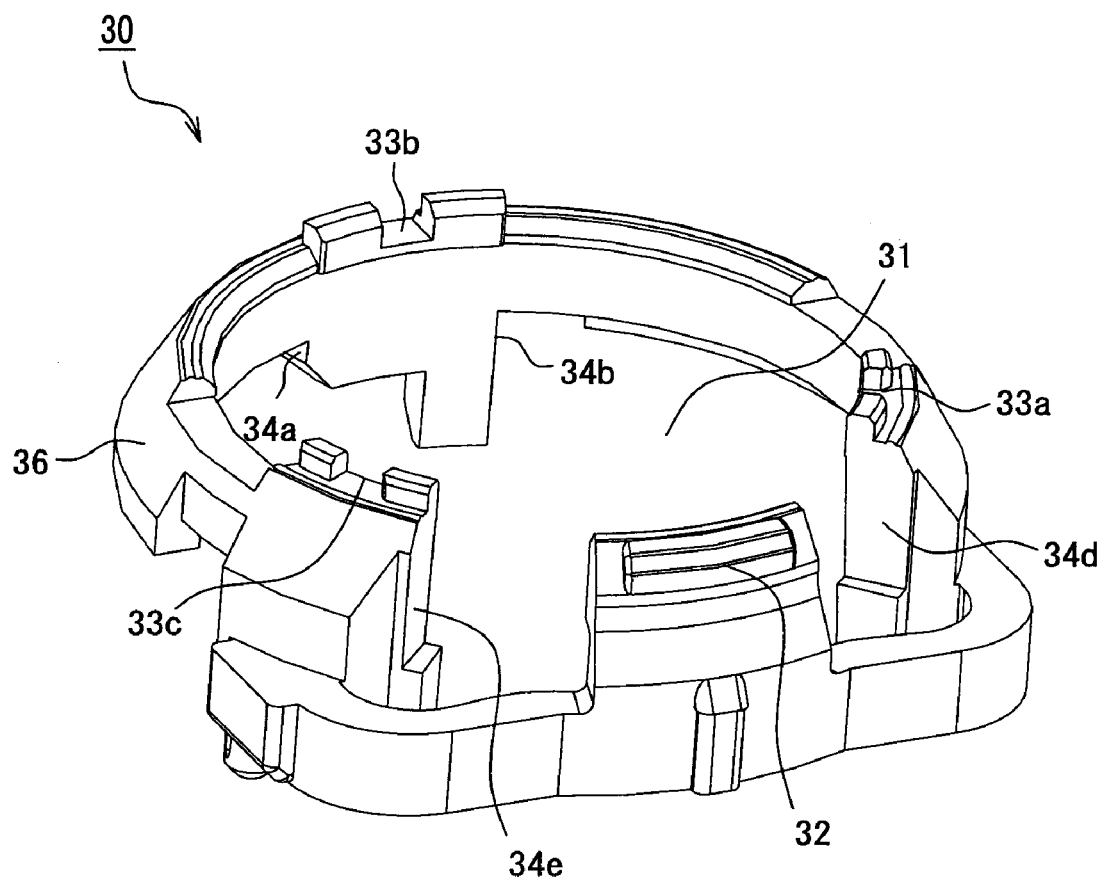
FIG. 9 is a perspective view illustrating the configuration of a first holder.
Figure 10:
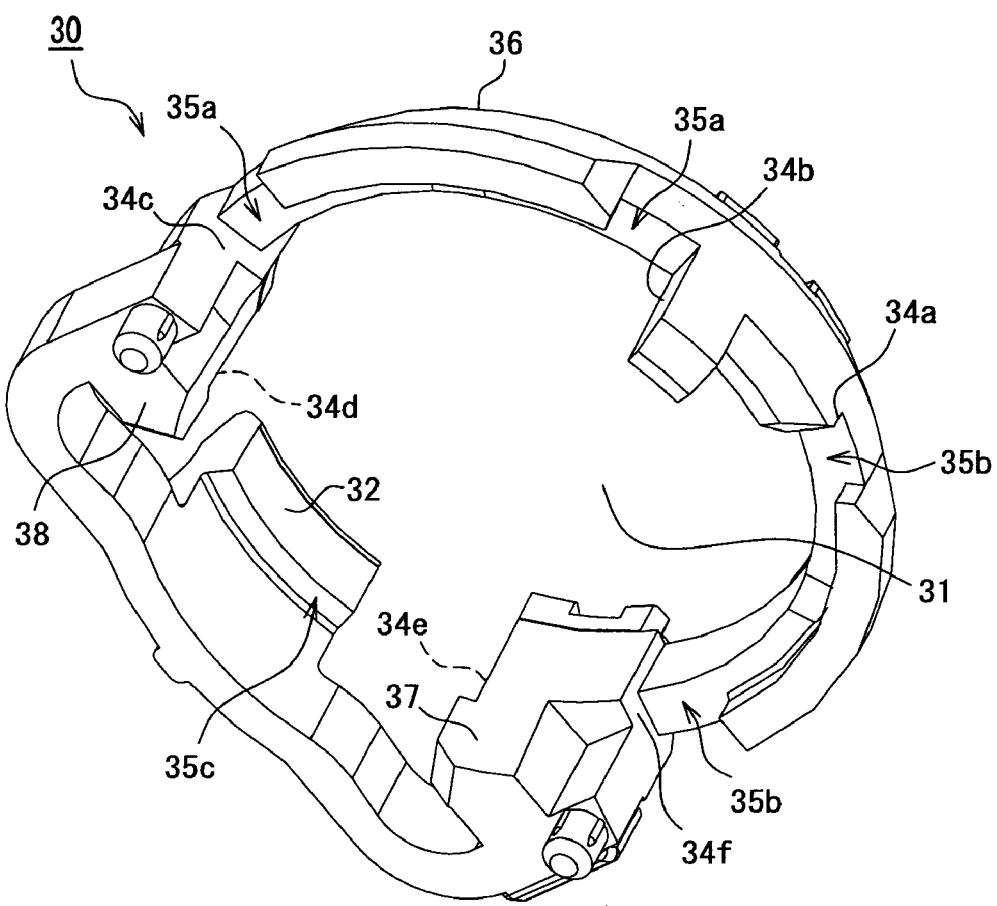
FIG. 10 is a perspective view illustrating the configuration of the first holder.

FIG. 9 is a perspective view illustrating the configuration of the first holder 30. FIG. 10 is a perspective view illustrating the first holder 30, as viewed from the bottom surface side. The first holder 30 shown in FIGS. 9 and 10 includes an opening 31, an engagement portion 32, the recessed portions 33a through 33c, the contact surfaces 34a through 34f, the sliding surfaces 35a through 35c, and a circular member 36. With respect to the circular member 36, the surface that faces the bottom surface of the upper cover 10 is defined as the "top surface" of the circular member 36, while the surface opposite from this top surface is defined as the "bottom surface" of the circular member 36 (see FIG. 3).

The opening 31 is formed approximately in the center of the circular member 36, and the zoom lever 20, release button 40, and so on are disposed therewithin.

The engagement portion 32 is formed so as to protrude from the top surface of the circular member 36 and furthermore protrude toward the center of the opening 31.

The recessed portions 33a through 33c are formed in the top surface of the circular member 36. The protruding portion 13a (see FIG. 4) interlocks with the recessed portion 33a, the protruding portion 13b (see FIG. 4) interlocks with the recessed portion 33b, and the protruding portion 13c (see FIG. 4) interlocks with the recessed portion 33c; through this, the first holder 30 can be positioned with respect to the support member 12 (see FIG. 4).

The contact surfaces 34a through 34f (first contact surfaces) are formed on the bottom surface side of the circular member 36. The contact surfaces 27a, 27d, and 27e formed in the zoom lever 20 make contact with the contact surfaces 34b, 34f, and 34d, respectively, when the zoom lever 20 is rotated in one direction to the rotational end. Furthermore, the contact surfaces 27b, 27c, and 27f formed in the zoom lever 20 make contact with the contact surfaces 34c, 34a, and 34e, respectively, when the zoom lever 20 is rotated in the other direction to the rotational end. The lines extending toward the center of the opening 31 from the surfaces of the contact surfaces 34a through 34f are not through to the rotational axis of the zoom lever 20. That is to say, the contact surfaces 34a through 34f are configured so as to be slanted relative to the radial direction of the circular opening 31.

The sliding surfaces 35a through 35c are formed in the bottom surface of the circular member 36. The sliding surfaces 35a through 35c make contact with the engagement portions 25a through 25c (see FIG. 7) formed in the zoom lever 20, and are surfaces on which the engagement portions 25a through 25c slide when the zoom lever 20 is rotated in the directions indicated by the arrows A or B (see FIG. 2).

[2-5. Configuration of Release Button 40 and Spring 50]

Figure 11:
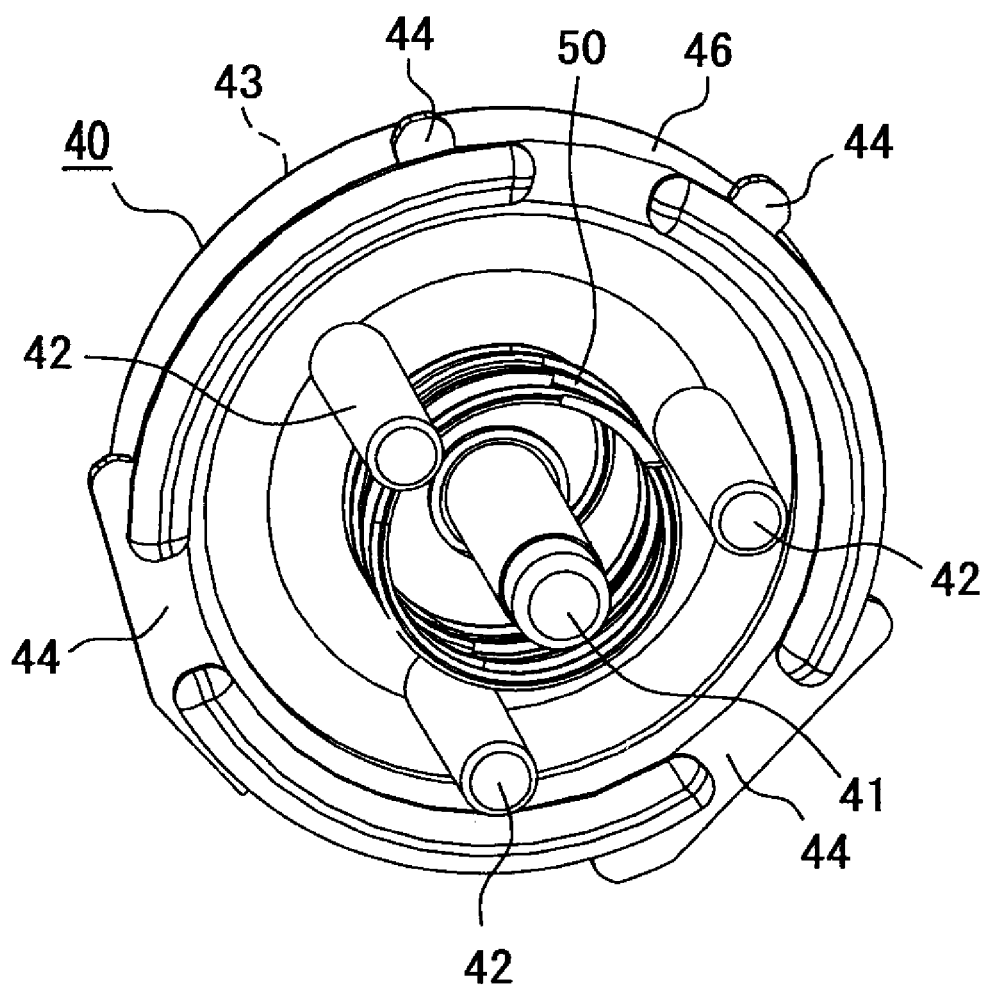
FIG. 11 is a perspective view illustrating the configuration of a release button.

FIG. 11 is a perspective view illustrating a state in which the spring 50 is mounted on the release button 40. Note that FIG. 11 is drawn so that the configuration of the bottom surface side of the release button 40 can be seen. As shown in FIG. 11, the release button 40 includes a protruding portion 41, protruding portions 42, a manipulation surface 43, the flange 44, and a manipulation member 46. Note that with respect to the manipulation member 46, the surface opposite relative to the manipulation surface 43 is defined as the "bottom surface" of the manipulation member 46. Furthermore, the manipulation member 46 is formed so as to be approximately disk-shaped.

The protruding portion 41 is formed in an approximately cylindrical shape, and stands approximately in the center of the bottom surface of the manipulation member 46. The tip of the protruding portion 41 can depress the release switch 83 (see FIG. 3) when the release button 40 is depressed in the direction indicated by the arrow C (see FIG. 2). When the release button 40 is not in a depressed state, the release button 40 is in a returned position, due to the spring 50, and the protruding portion 41 is in a position in which it is not depressing the release switch 83.

The protruding portions 42 are each formed in an approximately cylindrical shape, and are formed in three places on the bottom surface of the manipulation member 46, around the protruding portion 41. The protruding portions 42 can regulate the movement of the release button 40 in the depressed direction and hold the position of the manipulation member 46 when the release button 40 is depressed in the direction indicated by the arrow C (see FIG. 2).

The manipulation surface 43 is the surface exposed to the outside when the release button 40 is disposed in the upper cover 10.

The flange 44 is formed around the periphery of the bottom surface of the manipulation member 46, and protrudes in the direction parallel to the bottom surface. The surface of the flange 44 on the side of the manipulation surface 43 makes contact with the limiting surface 26b (described later) of the zoom lever 20, which prevents the release button 40 from falling out of the operating device.

The spring 50 is configured as a coil spring, and is disposed on the bottom surface of the manipulation member 46. Furthermore, the spring 50 is disposed in an approximately central position relative to the protruding portion 41. After the release button 40 has been depressed in the direction indicated by the arrow C (see FIG. 2), the spring 50 exerts an energizing force on the release button 40 in the direction opposite to that indicated by the arrow C so that the release button 40 returns to its original position.

[2-6. Configuration of Second Holder 60 and Return Spring 70]

Figure 12:
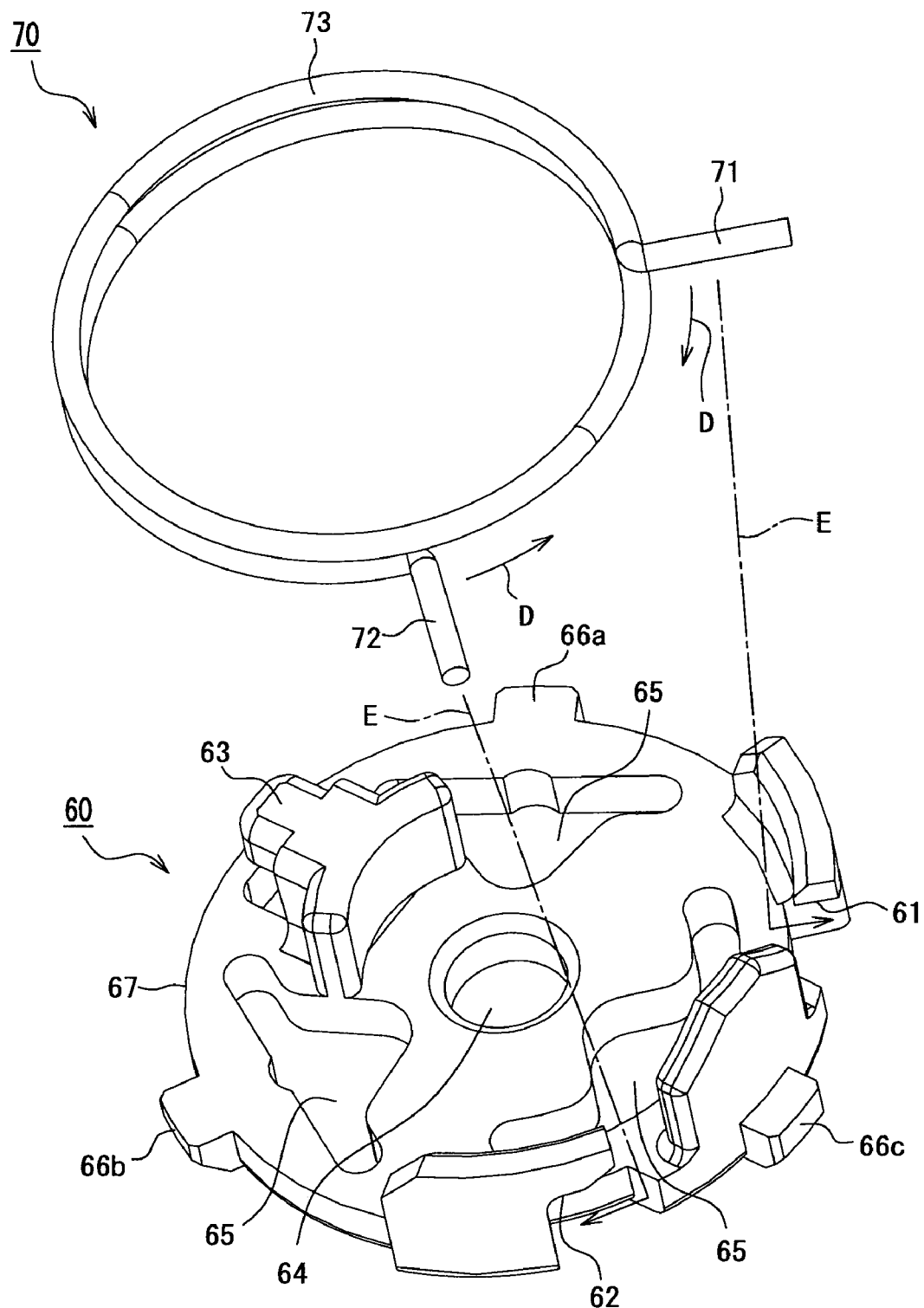
FIG. 12 is an exploded perspective view illustrating the configuration of a second holder and a return spring.
Figure 13:
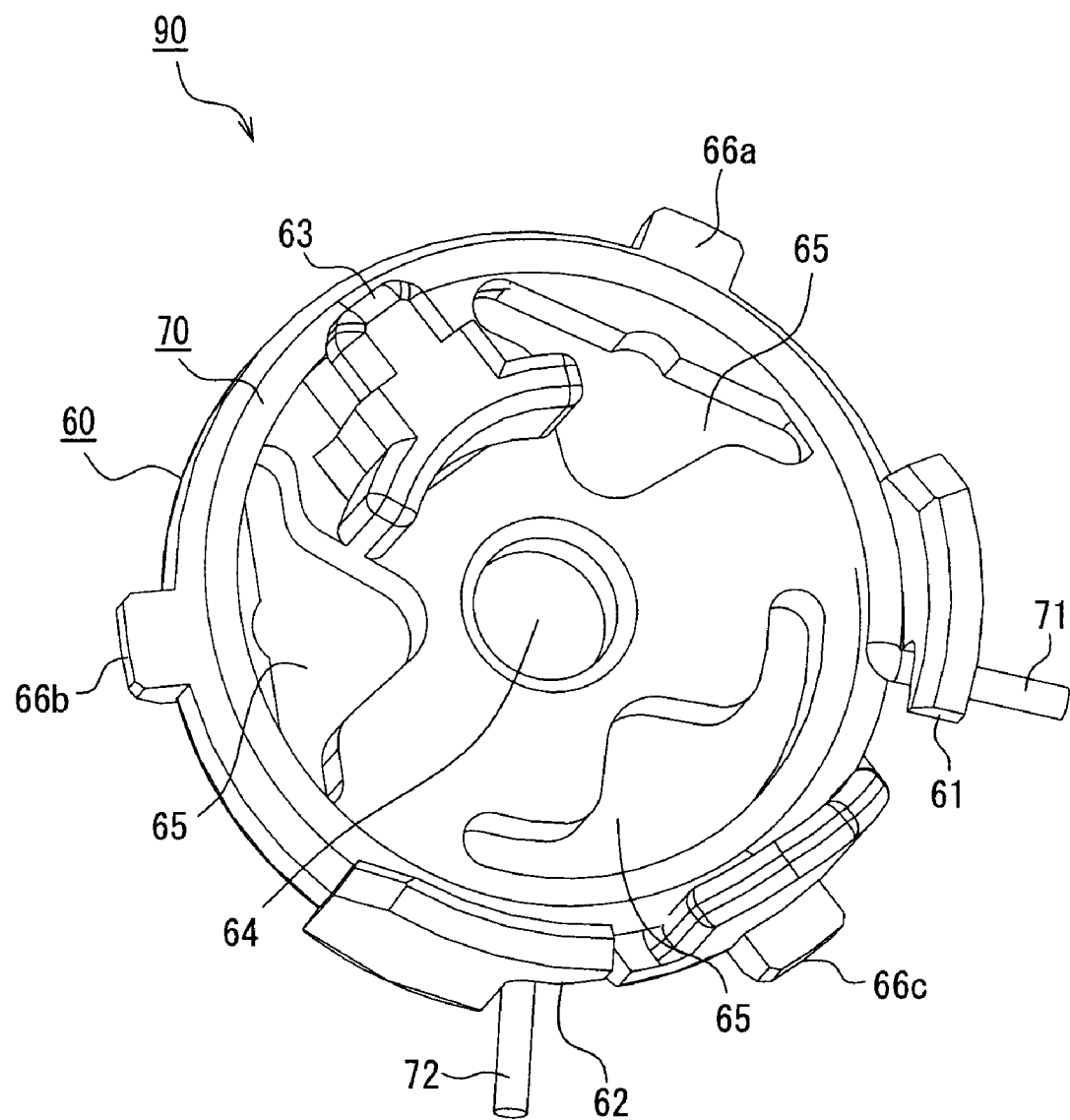
FIG. 13 is a perspective view illustrating the configuration of a pre-prepared member.

FIG. 12 is a perspective view illustrating the configuration of the second holder 60 and the return spring 70. FIG. 13 is a perspective view illustrating the configuration of a pre-prepared member 90, in which the second holder 60 and the return spring 70 have been conjoined. As shown in FIGS. 12 and 13, the second holder 60 includes engagement portions 61 through 63, hole portions 64 and 65, protruding portions 66a through 66c, and a holder member 67. The holder member 67 is formed so as to be approximately disk-shaped. With respect to the holder member 67, the surface that faces the bottom surface of the upper cover 10 is defined as the "top surface" of the holder member 67, the surface opposite from this top surface is defined as the "bottom surface" of the holder member 67, and the surface aside from the top and bottom surfaces is defined as the "side surface" (see FIG. 3).

The engagement portions 61 and 62 are formed on the side surface of the holder member 67. An end part 71 of the return spring 70 is engaged with the engagement portion 61. An end part 72 of the return spring 70 is engaged with the engagement portion 62.

The engagement portion 63 is formed on the top surface of the holder member 67. Part of a coiled part 73 of the return spring 70 is engaged with the engagement portion 63. The engagement portion 63 is formed, as shown in FIGS. 12 and 13, in an overhanging shape relative to the base portion of the holder member 67. For this reason, the configuration is such that the return spring 70 will not easily become detached on the top surface side when the return spring 70 is in a mounted state as shown in FIG. 13.

The hole portion 64 is formed in approximately the center of the holder member 67, and passes through the holder member 67. The hole portion 64 is arranged with the protruding portion 41, which is formed in the release button 40, passing therethrough. (See FIGS. 3 and 11.)

The hole portions 65 are formed in three places around the hole 64 in the holder member 67, and pass through the holder member 67. The hole portions 65 are arranged with the three respective protruding portions 42 (see FIG. 11) formed in the release button 40 passing therethrough.

The protruding portions 66a through 66c are formed in the side surface of the holder member 67, protruding outward. The protruding portions 66a through 66c interlock with the openings 24a through 24c (see FIG. 7) formed in the zoom lever 20 through snap-fitting (details shall be given later). The second holder 60 and the zoom lever 20 can be conjoined by interlocking the protruding portions 66a through 66c with the openings 24a through 24c.

[3. Assembly Method of Operating Device]

Next, an assembly method for the operating device according to embodiment 1 shall be described. The operating device according to the present invention is assembled through a process such as follows: (1) the pre-prepared member 90 is created; (2) the first holder 30 is mounted on the upper cover 10; (3) the zoom lever 20 is mounted on the upper cover 10; (4) the release button 40, spring 50, and pre-prepared member 90 are mounted on the upper cover 10; and (5) the electric circuit unit 80 is mounted on the upper cover 10. Note that the present device can be assembled even if the order of (2) and (3) mentioned here are reversed. Hereinafter, the assembly procedure of the operating device shall be described in detail.

[3-1. Creation of Pre-Prepared Member 90]

First, as shown in FIG. 12, part of the coiled part 73 of the return spring 70 (the part that is approximately opposite the end parts 71 and 72) is engaged with the engagement portion 63.

Next, the end parts 71 and 72 of the return spring 70 are engaged with the engagement portions 61 and 62, respectively, as indicated by arrow E, while being moved in the direction indicated by arrows D, causing the return spring 70 to undergo elastic deformation.

As indicated in FIG. 13, the return spring 70 returns from the elastically-deformed state to its original shape after the end parts 71 and 72 have been engaged with the engagement portions 61 and 62, and thus the end parts 71 and 72 are in a state in which their movement in the direction of the ridge line is regulated. The pre-prepared member 90 thus is completed.

Although the return spring conventionally has been mounted directly onto the bottom surface of the zoom lever after the zoom lever has been mounted on the upper cover 10, there are problems with the workability of such an assembly method. That is to say, the workability of the return spring itself is extremely poor because the spring is small and is required to be mounted to the bottom surface of the zoom lever while undergoing elastic deformation.

However, according to the present embodiment, when mass-producing the operating device or devices including the operating device, the return spring 70 is incorporated into the zoom lever 20 by first mounting the return spring 70 on the second holder 60, thus creating the pre-prepared member 90 shown in FIG. 13, and then mounting the pre-prepared member 90 on the zoom lever 20. In other words, the configuration does not have the return spring 70 mounted directly on the zoom lever 20, but instead has the return spring 70 first mounted on the second holder 60, which easily can be mounted on the zoom lever 20, and then the second holder 60 is mounted on the zoom lever 20. This greatly improves the workability of the assembly process. Furthermore, the return spring 70 can be mounted on the second holder 60 with ease, and thus the pre-prepared member 90 also can be created with ease.

[3-2. Mounting Method of First Holder 30]

Next, the first holder 30 illustrated in FIGS. 9 and 10 is mounted on the support member 12 of the upper cover 10 illustrated in FIGS. 4 and 6.

To be more specific, first, the first holder 30 is disposed on the bottom surface side of the upper cover 10. At this time, the first holder 30 is arranged so that its bottom surface is facing the top surface of the upper cover 10. Next, the recessed portion 33a formed in the first holder 30 is interlocked with the protruding portion 13a, the recessed portion 33b formed in the first holder 30 is interlocked with the protruding portion 13b, and the recessed portion 33c formed in the first holder 30 is interlocked with the protruding portion 13c. Through this, the positioning of the first holder 30 in the circumferential direction relative to the upper cover 10 can be set.

This in turn makes it possible to mount the first holder 30 on the upper cover 10.

[3-3. Mounting Method of Zoom Lever 20]

Next, the zoom lever 20 illustrated in FIGS. 7 and 8 is mounted on the first holder 30 illustrated in FIGS. 9 and 10.

To be more specific, the zoom lever 20 is inserted into the opening 11 and the opening 31 from the top surface side of the upper cover 10. At this time, the maximum outer diameter formed by the support portions 23a through 23c is greater than the inner diameter of the opening 31, and thus the support portions 23a through 23c slide on the inner surface of the opening 31.

When the zoom lever 20 is moved into a predetermined position within the opening 31, the support portions 23a through 23c return to their original state from a state in which they are elastically deformed, and the engagement portions 25a through 25c engage with the sliding surfaces 35a through 35c. Here, the engagement portion 25a is engaged with the sliding surface 35a, the engagement portion 25b is engaged with the sliding surface 35b, and the engagement portion 25c is engaged with the sliding surface 35c. This makes it possible to dispose the operating portion 21 of the zoom lever 20 in the correct position, as illustrated in FIG. 1.

Figure 14:
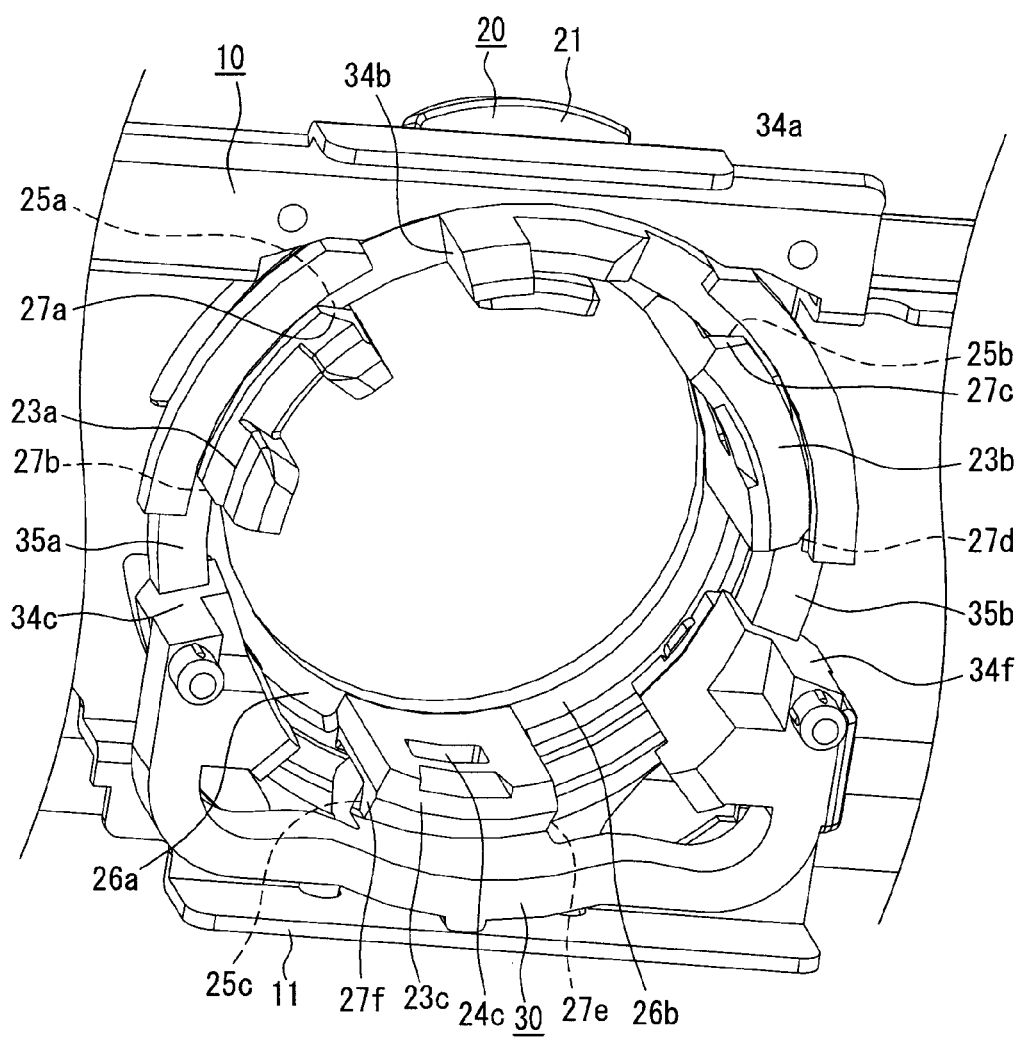
FIG. 14 is a perspective view illustrating the relevant parts when the zoom lever and first holder are in a mounted state.

Through the process described above, the mounting of the zoom lever 20 to the first holder 30 is completed, resulting in the state illustrated in FIG. 14. When the zoom lever 20 is mounted on the first holder 30, it can be rotated in the circumferential direction. The range of movement of the support portion 23a of the zoom lever 20 is regulated by the contact surfaces 34b and 34c formed on each end of the sliding surface 35a in the lengthwise direction (see FIG. 10). In addition, the range of movement of the support portion 23b is regulated by the contact surfaces 34a and 34f formed on each end of the sliding surface 35b in the lengthwise direction (see FIG. 10). Also, the range of movement of the support portion 23c is regulated by the contact surfaces 34d and 34e formed on each end of the sliding surface 35c in the lengthwise direction (see FIG. 10).

It should be noted that while in the present embodiment, the procedure has the zoom lever 20 being mounted after the first holder 30 is mounted on the upper cover 10, the assembly can be performed in the same manner even if the procedure has the first holder 30 being mounted on the upper cover 10 after the zoom lever 20 is inserted into the upper cover 10.

[3-4. Mounting Method of Release Button 40, Spring 50, Pre-Prepared Member 90]

Figure 15:
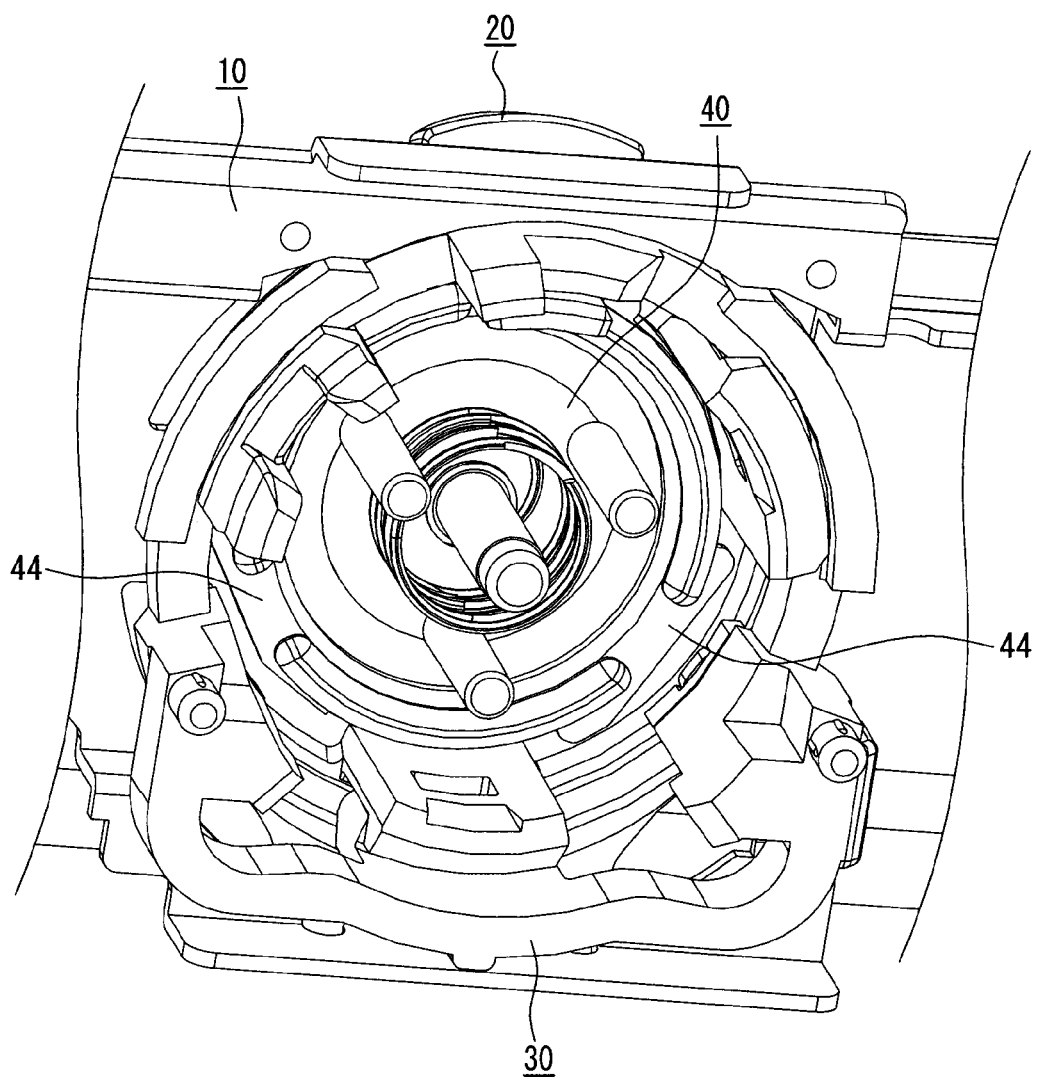
FIG. 15 is a perspective view illustrating the relevant parts when the release button is in a mounted state.

Next, the release button 40 and spring 50 illustrated in FIG. 11 are inserted into the zoom lever 20. To be more specific, the release button 40 and spring 50 are inserted in that order into the opening 22 from the bottom surface side of the zoom lever 20. At this time, the flange 44 formed in the release button 40 and the limiting surface 26b formed in the zoom lever 20 prevent the release button 40 from coming out of the top surface side of the zoom lever 20. Furthermore, the manipulation surface 43 of the release button 40 is exposed to the exterior via the opening 22 of the zoom lever 20, as illustrated in FIGS. 1 and 2. FIG. 15 illustrates a state in which the release button 40 has been inserted into the zoom lever 20 from the bottom surface side of the zoom lever 20.

Next, the pre-prepared member 90 illustrated in FIG. 13 is inserted into the zoom lever 20. To be more specific, the pre-prepared member 90 is inserted, from the state illustrated in FIG. 15, so that its bottom surface is facing the bottom surface of the release button 40. At this time, the pre-prepared member 90 is inserted into the zoom lever 20 so that the positions of the protruding portion 66a and opening 24b, the protruding portion 66b and opening 24a, and the protruding portion 66c and opening 24c in the circumferential direction match with one another. The pre-prepared member 90 is mounted on the zoom lever 20 in such a manner that the protruding portion 41 passes through the hole portion 64 and the protruding portions 42 pass through the hole portions 65. Furthermore, the pre-prepared member 90 is mounted on the zoom lever 20 with its bottom surface slightly pushing down on and compressing the spring 50, which makes it possible to ensure that the stroke of the release button 40 travels in the direction indicated by the arrow C (see FIG. 2) while also suppressing wobbles in the release button 40.

When the pre-prepared member 90 is caused to move to a predetermined position within the zoom lever 20, the protruding portion 66a rides up onto the sloped portion on the lower side of the opening 24b shown in FIG. 7, and ultimately interlocks with the opening 24b by undergoing elastic deformation. The protruding portion 66b also interlocks with the opening 24a in the same manner, as does the protruding portion 66c with the opening 24c.

Figure 16:
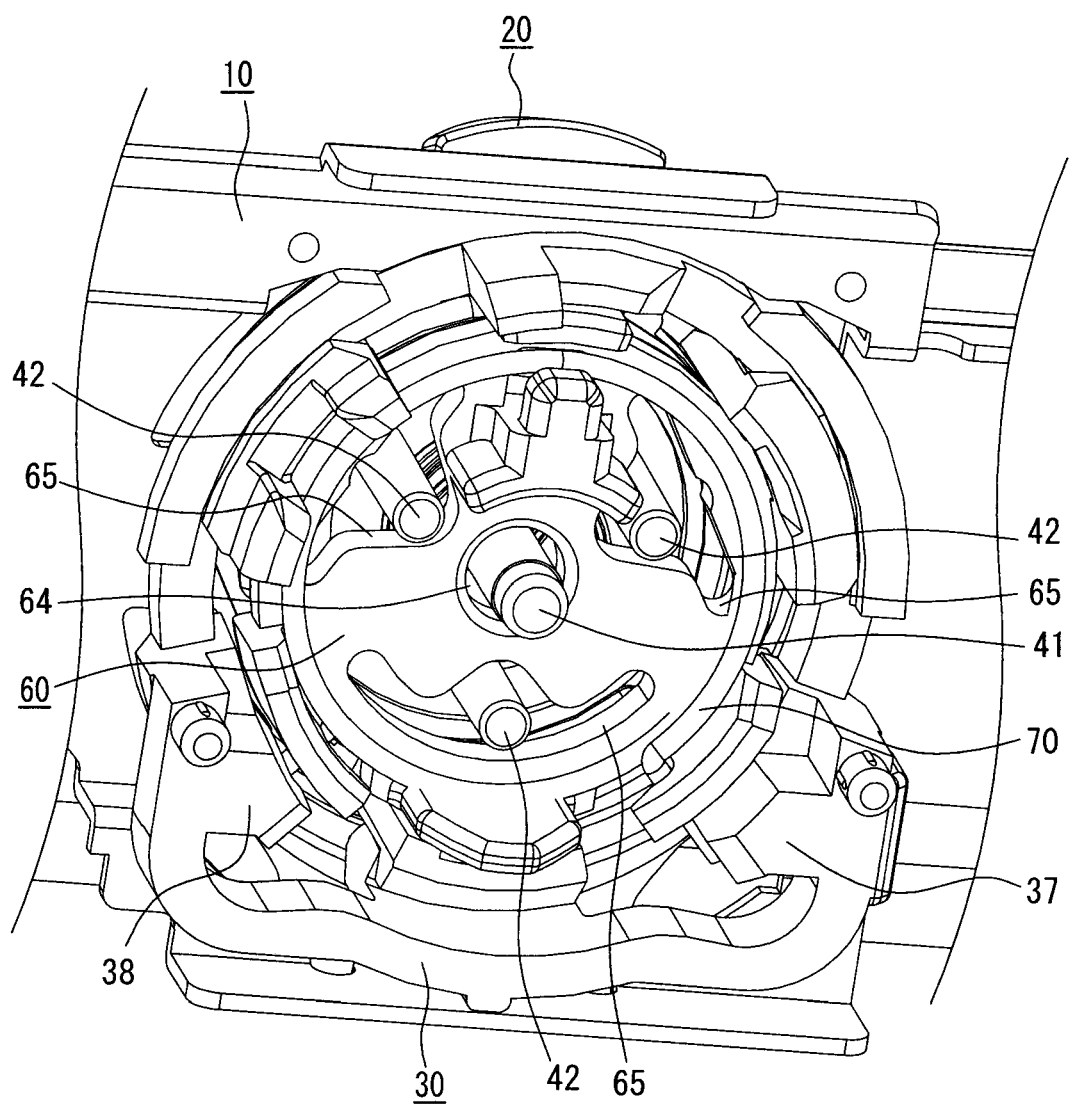
FIG. 16 is a perspective view illustrating the relevant parts when the pre-prepared member is in a mounted state.
Figure 17:
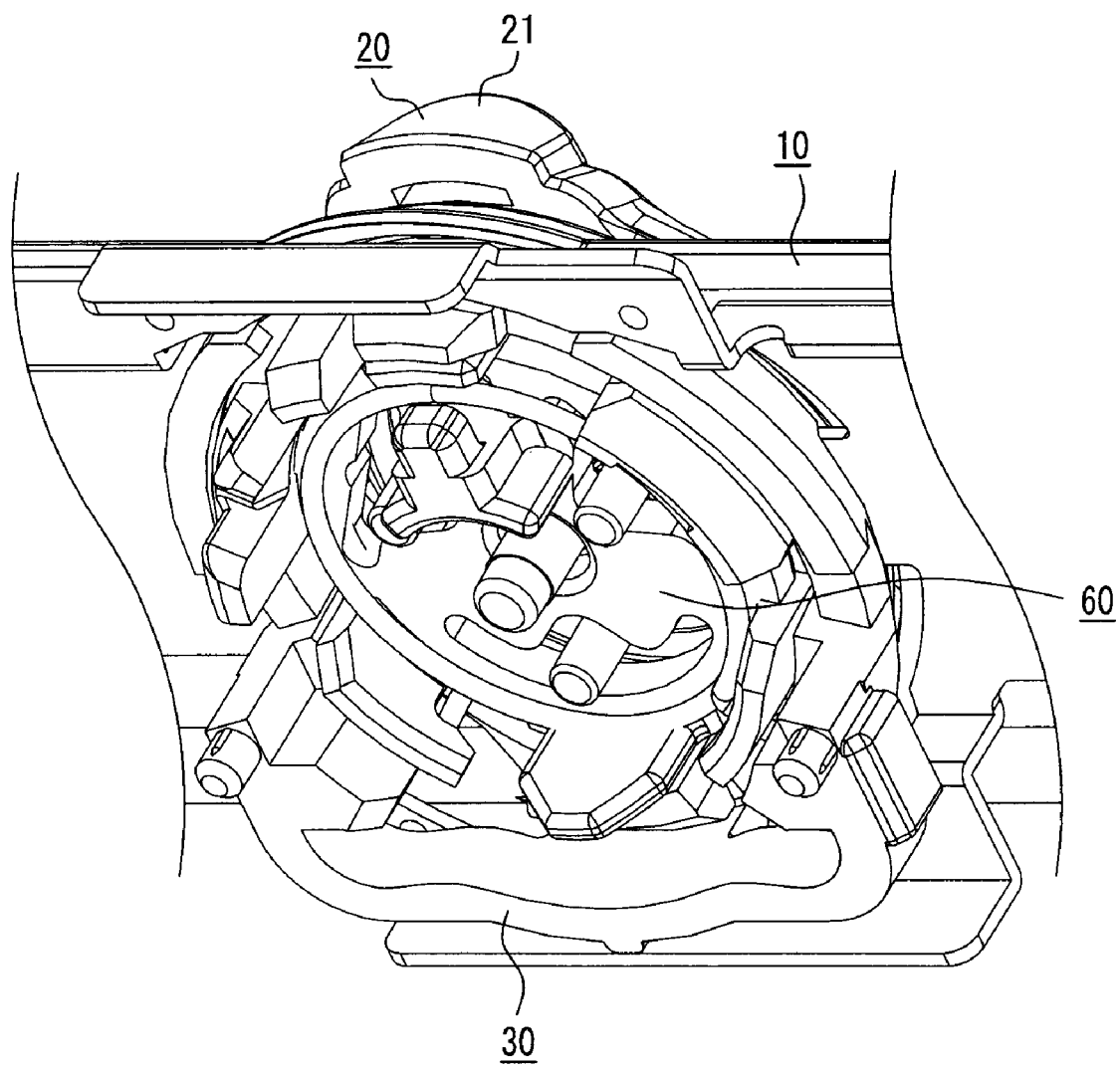
FIG. 17 is a perspective view illustrating the relevant parts when the pre-prepared member is in a mounted state.

Through the process described above, the mounting of the pre-prepared member 90 to the zoom lever 20 is completed, resulting in the state illustrated in FIGS. 16 and 17. FIGS. 16 and 17 show states in which the mounting of the pre-prepared member 90 to the zoom lever 20 is completed, and show views from different angles. As shown in FIGS. 16 and 17, the protruding portion 41 is passed through the hole portion 64 and is in a protruding position. Furthermore, the protruding portions 42 are passed through the hole portions 65 and are in protruding positions.

[3-4-1. Movement of Return Spring 70]

Next, the movement of the return spring 70 when the pre-prepared member 90 is mounted on the zoom lever 20 shall be described.

Figure 18:
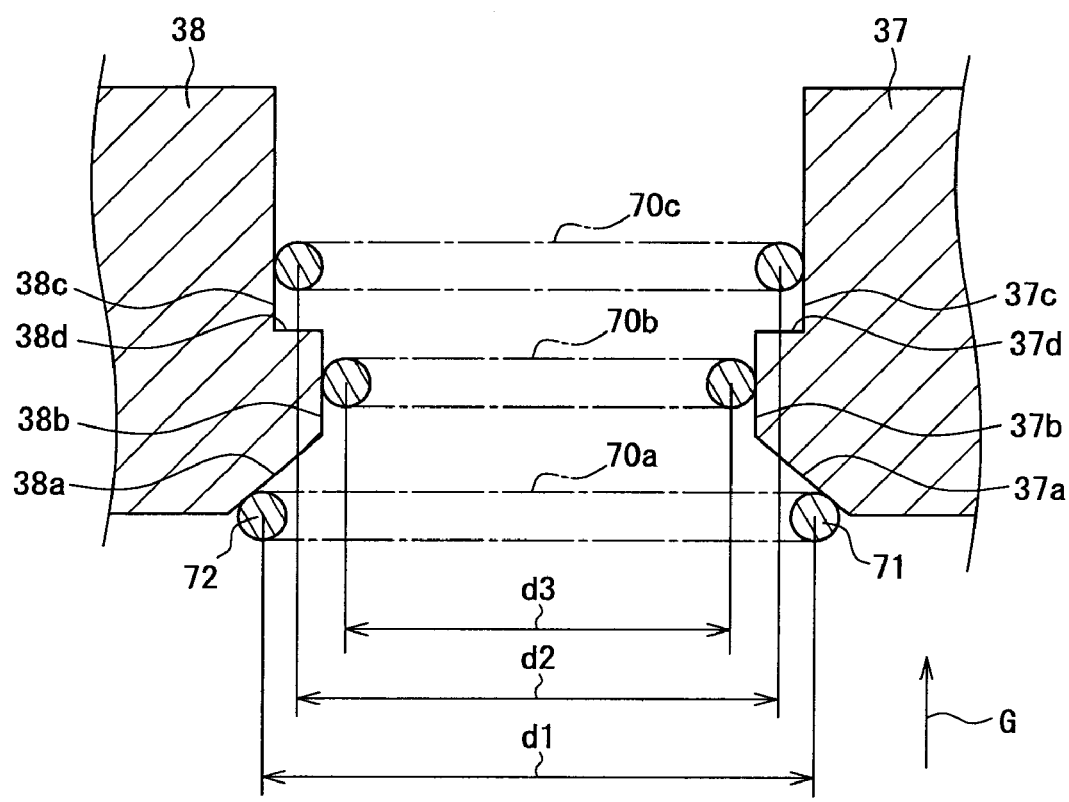
FIG. 18 is a cross-sectional view illustrating the relevant parts when a return spring is in a displaced state.

FIG. 18 is a cross-section illustrating the path of movement of the end parts 71 and 72 (FIG. 13) when the pre-prepared member 90 is mounted on the zoom lever 20. FIG. 18 is a cross-section viewed along a straight line that passes through holding portions 37 and 38 and the end parts 71 and 72 shown in FIG. 16. As can be seen in FIG. 18, a sloped surface 37a, a plateau surface 37b, a holding surface 37c, and a limiting surface 37d are formed on the holding portion 37. Meanwhile, a sloped surface 38a, a plateau surface 38b, a holding surface 38c, and a limiting surface 38d are formed on the holding portion 38. Note that the plateau surfaces 37b and 38b are not necessary, and the formation may be such that the sloped surfaces 37a and 38a continue directly into the limiting surfaces 37d and 38d. Moreover, while the limiting surfaces 37d and 38d are formed approximately parallel to the holding surfaces 37c and 38c, they instead may be formed at an angle thereto.

Dimension d1 indicates the space between the end parts 71 and 72 in a state where the return spring 70 has been incorporated into the second holder 60. Dimension d3 indicates the space between the end parts 71 and 72 when the end parts 71 and 72 are making contact with the plateau surfaces 37b and 38b, respectively. Dimension d2 indicates the space between the end parts 71 and 72 when the end parts 71 and 72 are making contact with the holding surfaces 37c and 38c. These dimensions fulfill the following relationship:

$$d3<d2<d1 \quad \text{(Equation 1)}$$

As illustrated in FIG. 18, when the return spring 70 is moved in the direction indicated by arrow G from the bottom surface side of the first holder 30, the end parts 71 and 72 first make contact with the sloped surfaces 37a and 38a (position 70a). When the return spring 70 is moved in the direction of the arrow G from a state in which it is in the position 70a, the end parts 71 and 72 slide along the sloped surfaces 37a and 38a; as a result, the return spring 70 undergoes elastic deformation, and the space between the end parts 71 and 72 gradually decreases.

When the end parts 71 and 72 are moved to a position in which they make contact with the plateau surfaces 37b and 38b, the space between the end parts 71 and 72 decreases to the dimension d3 due to the elastic deformation of the return spring 70. This is indicated by position 70b.

When the return spring 70 is further moved in the direction of the arrow G from the position 70b, it moves into position 70c. At this time, the end parts 71 and 72 pass the limiting surfaces 37d and 38d, and move into a position in which they make contact with the holding surfaces 37c and 38c. The space between the end parts 71 and 72 increases from the dimension d3 to the dimension d2. The second holder 60 is considered to be mounted to the zoom lever 20 when the return spring 70 is in position 70c. Furthermore, when the return spring 70 is in the position 70c, the movement of the end parts 71 and 72 in the direction opposite the arrow G (the direction of detachment) is limited by the limiting surfaces 37d and 38d. This makes it possible to prevent the end parts 71 and 72 from becoming detached from the holding portions 37 and 38.

In this manner, the configuration is such that when the pre-prepared member 90 is mounted to the zoom lever 20, the end parts 71 and 72 of the return spring 70 are guided by the sloped surfaces 37a and 38a formed on the holding portions 37 and 38; as a result, the end parts 71 and 72 can be held by the first holder 30 without sacrificing the ease of mounting the pre-prepared member 90 to the zoom lever 20.

Moreover, the return spring 70 undergoes elastic deformation when it is in position 70c because the dimension d3, found when the end parts 71 and 72 are being held by the holding surfaces 37c and 38c, fulfils the relationship shown above in Equation 1. Due to the elastic deformation of the return spring 70, the return spring 70 applies pre-tension to the zoom lever 20, which eliminates wobbling between the zoom lever 20 and the first holder 30. Therefore, when the zoom lever 20 is in the neutral position, wobbles of the zoom lever 20 in the rotational direction can be suppressed, therefore improving the operability of the zoom lever 20 and also preventing the occurrence of noises arising due to the zoom lever 20 making contact with the first holder 30.

In addition, because the limiting surfaces 37d and 38d are formed, the end parts 71 and 72 will not easily become detached once they have been mounted.

[3-5. Mounting Method of Electric Circuit Unit 80]

Figure 19:
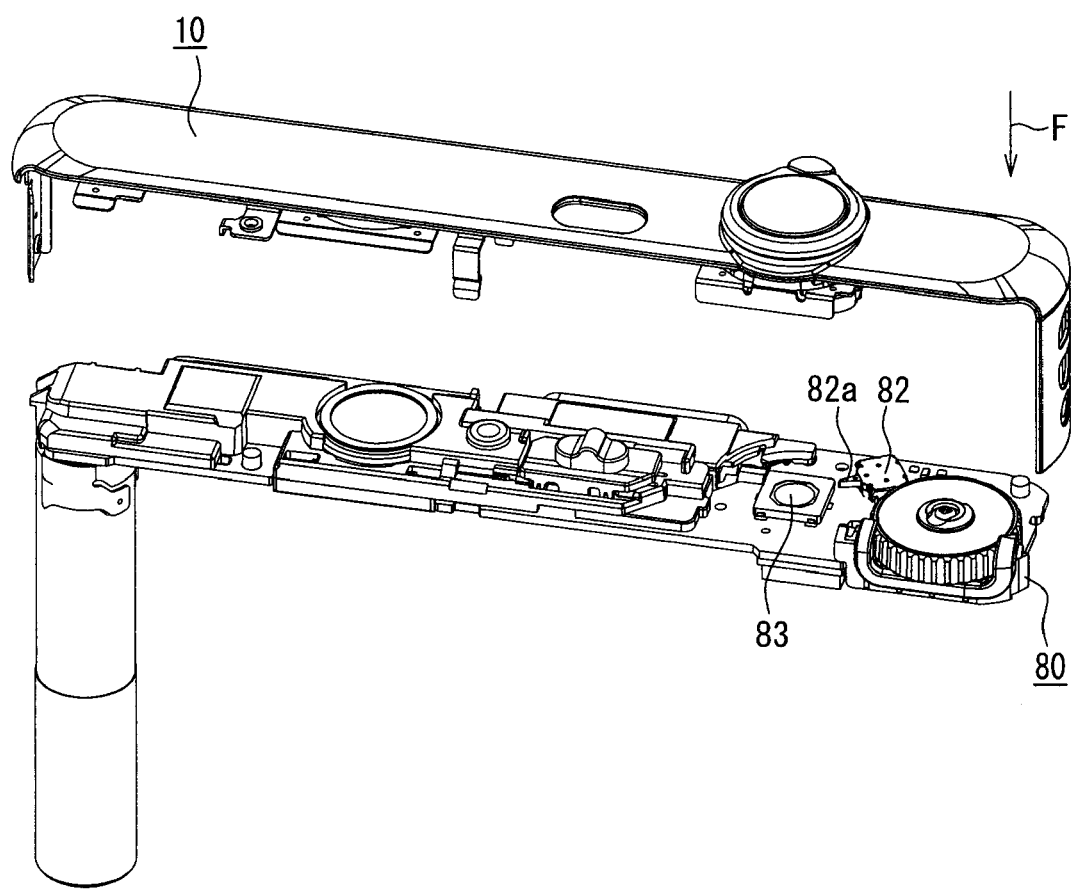
FIG. 19 is a perspective view illustrating the configuration of the upper cover and an electric circuit unit.

As illustrated in FIG. 19, the upper cover 10 is moved in the direction indicated by arrow F, and thereby is conjoined with the electric circuit unit 80. At this time, the recessed portion 28 formed in the zoom lever 20 interlocks with the lever 82a of the zoom switch 82. This makes it possible for the support portion 23a to push on the lever 82a and switch the zoom switch 82 when the zoom lever 20 is rotated in the directions indicated by the arrows A or B (see FIG. 2). The protruding portion 41 formed on the release button 40 also is disposed facing the operational surface of the release switch 83. Accordingly, the protruding portion 41 can press down upon the operational surface of the release switch 83 when the release button 40 is depressed in the direction indicated by the arrow C (see FIG. 2).

Figure 20:
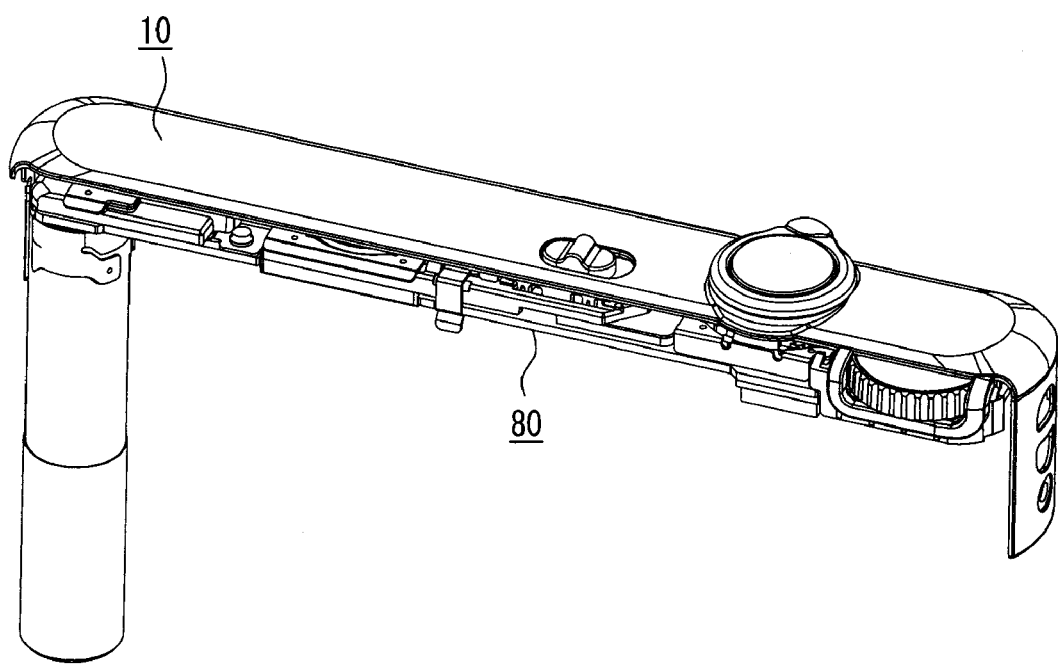
FIG. 20 is a perspective view illustrating the configuration of the upper cover and the electric circuit unit.

FIG. 20 illustrates a state in which the upper cover 10 and the electric circuit unit 80 are conjoined.

The operating device assembled as described thus far is therefore incorporated into a device such as a digital still camera in such a manner.

[4. Operations of Operating Device]

[4-1. Operations During Zoom Operation]

Figure 21:
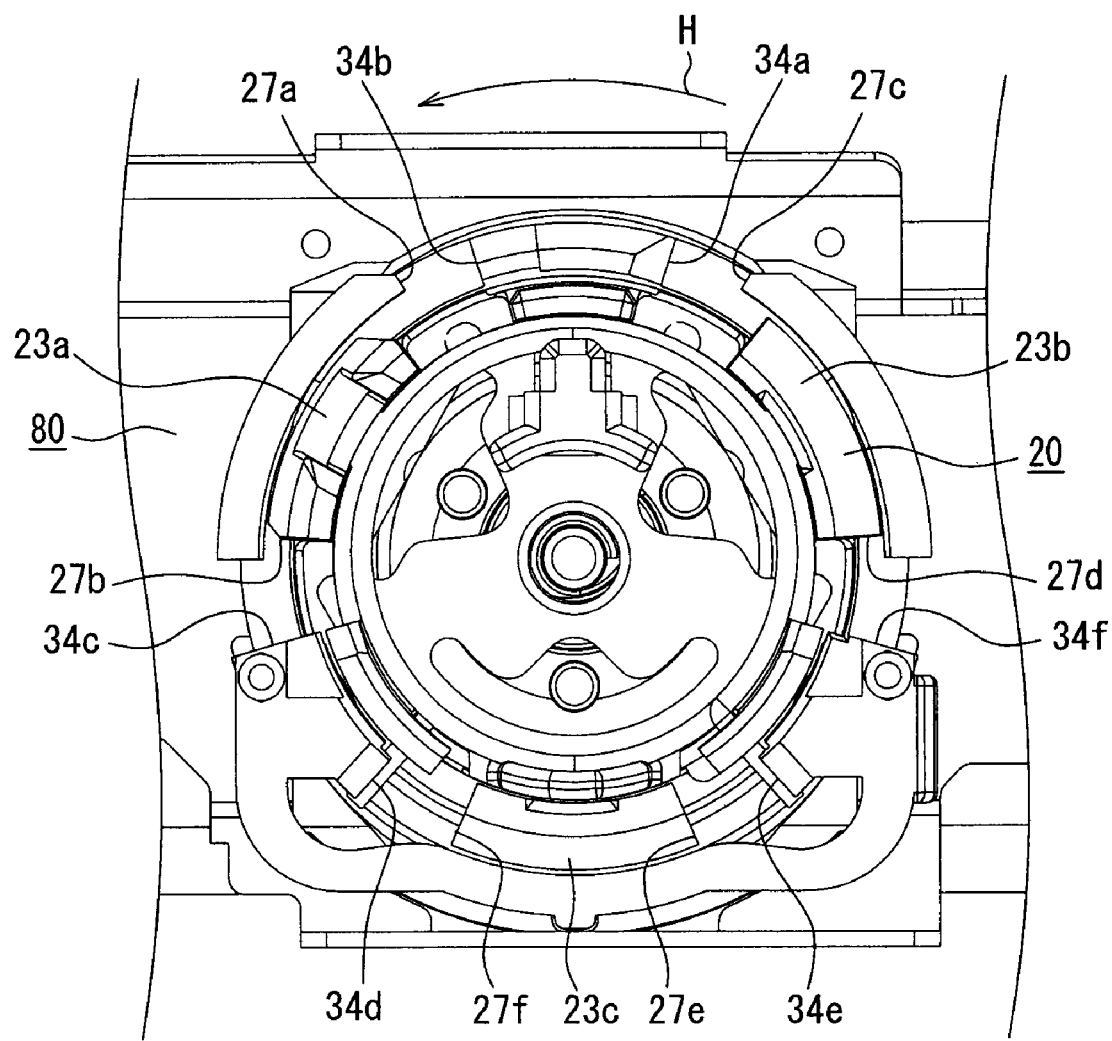
FIG. 21 is a plan view of the relevant parts of the operating device, showing the configuration of the bottom side thereof.
Figure 22:
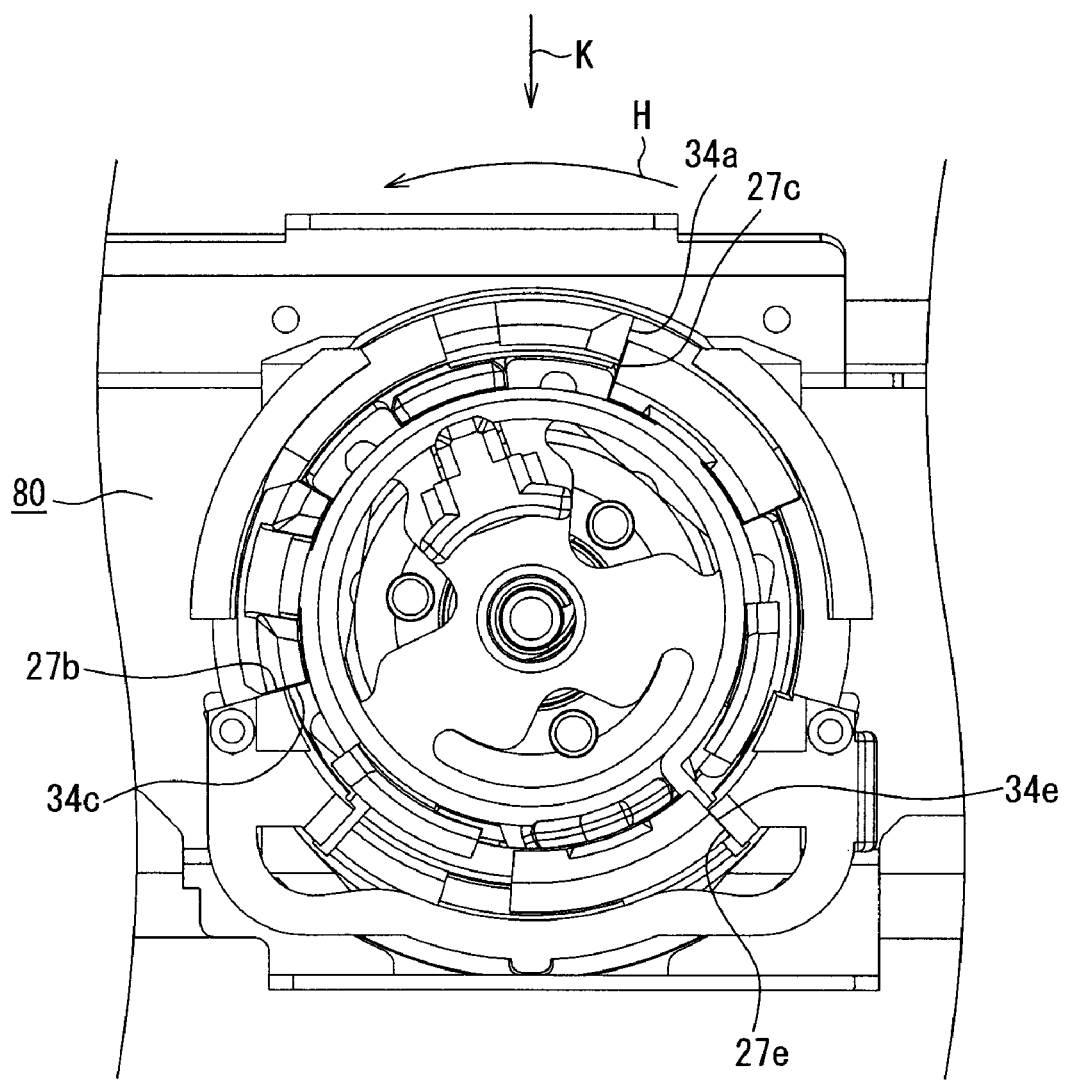
FIG. 22 is a plan view of the relevant parts of the operating device, showing the configuration of the bottom side thereof.

FIGS. 21 and 22 are diagrams illustrating the configuration of the operating device when viewed from the bottom surface side of the upper cover 10. FIG. 21 illustrates a state in which the zoom lever 20 is in the neutral position. FIG. 22 illustrates a state in which the zoom lever 20 has been rotated to the rotational end in the direction indicated by arrow H (equivalent to the direction of the arrow B in FIG. 2).

In the state shown in FIG. 21, the zoom lever 20 is energized by the energizing force of the return spring 70 (see FIG. 13, etc.) so as to remain in the neutral position. To be more specific, the second holder 60 is energized by the return spring 70 to the neutral position, and the zoom lever 20 that is coupled with the second holder 60 is also energized to the neutral position. At this time, none of the support portions 23a through 23c are making contact with any of the contact surfaces 34a through 34f. Furthermore, the zoom switch 82 is in a neutral position, and thus zoom operation is in an "off" state.

When the zoom lever 20 is rotated in the direction indicated by the arrow H from the state shown in FIG. 21, the zoom lever 20 and the second holder 60 rotate in the direction of the arrow H, against the exerted force of the return spring 70. Here, when the zoom lever 20 and the second holder 60 are in the position illustrated in FIG. 21, the spring end part 71 rests on the holding portion 37 and the engagement portion 61, while the spring end part 72 rests on the holding portion 38 and the engagement portion 62. By rotating the zoom lever 20 and the second holder 60 in the direction indicated by the arrow H from the state illustrated in FIG. 21, the spring end part 71 enters a state in which it rests only on the holding portion 37, and the spring end part 72 enters a state in which it rests only on the engagement portion 62. Accordingly, the return spring 70 undergoes elastic deformation, and running torque arises in the direction opposite of the arrow H against the zoom lever 20 and the second holder 60. Furthermore, by rotating the zoom lever 20 and the second holder 60 in the opposite direction of that indicated by the arrow H from the state illustrated in FIG. 21, the spring end part 71 enters a state in which it rests only on the engagement portion 61, and the spring end part 72 enters a state in which it rests only on the holding portion 38. Accordingly, the return spring 70 undergoes elastic deformation, and running torque arises in the direction of the arrow H against the zoom lever 20 and the second holder 60.

When the zoom lever 20 and the second holder 60 rotate, the support portion 23a causes the lever 82a of the zoom switch 82 to rotate, putting zoom operation into an "on" state. The zoom switch 82 according to the present embodiment outputs a signal that can control the zoom speed depending on the amount by which the lever 82a is rotated. Furthermore, because the release button 40 is held between the zoom lever 20 and the second holder 60, it rotates in the same direction therewith, in accordance with the rotation of the zoom lever 20 and the second holder 60.

When the zoom lever 20 is rotated to the rotational end in the direction indicated by the arrow H, the state illustrated in FIG. 22 arises. In the state illustrated in FIG. 22, the contact surface 27c makes contact with the contact surface 34a, the contact surface 27b makes contact with the contact surface 34c, and the contact surface 27e makes contact with the contact surface 34e. This makes it possible to limit further rotation of the zoom lever 20 in the direction of the arrow H.

[4-1-1. Distribution of Load on Contact Surfaces]

Here, it cannot be guaranteed that the contact load is evenly distributed among the contact surfaces 27b, 27c, 27e, 34a, 34c, and 34e, due to variations in the dimensional accuracy and assembly accuracy of the first holder 30 or the zoom lever 20. For example, the contact load may be concentrated in one place.

However, in the present embodiment, the contact surfaces 27b, 27c, 27e, 34a, 34c, and 34e are each formed having a slight slope. To be more specific, the contact surfaces are formed having a slope, so that lines extending from each contact surface toward the rotational center of the zoom lever 20 do not pass through the rotational center of the zoom lever 20. Accordingly, even if the zoom lever 20 is further rotated in the direction indicated by the arrow H when in a state where the contact surfaces 27b, 27c, 27e, 34a, 34c, and 34e are making contact with one another, or the zoom lever 20 is rotated with an excessive rotational force that brings the contact surfaces 27b, 27c, 27e, 34a, 34c, and 34e into contact with one another, no imbalance will arise in the load placed on the contact surfaces.

If, for example, the contact surfaces are formed so that lines extending from each contact surface toward the rotational center of the zoom lever 20 pass through the rotational center of the zoom lever 20, it cannot be guaranteed that the contact load is evenly distributed among the stated three contact points, due to variations in the dimensional accuracy and assembly accuracy of the first holder 30 or the zoom lever 20. If the load is concentrated on one of the stated three contact points, there is the possibility that the zoom lever 20 will become detached from the first holder 30, the zoom lever 20 or the first holder 30 will break, and so on.

In the present embodiment, because the contact surfaces are formed at a slope as described above, when a further load is placed on the zoom lever 20 in the direction of the arrow H in a state where contact is being made at only one of the stated three contact points, moving force occurs in the direction toward the rotational center of the (single) contact point, on the side of the zoom lever 20. Accordingly, the zoom lever 20 moves slightly in the direction parallel to the top surface of the upper cover 10. When the zoom lever 20 is moved, the contact load on the other contact points, which is low, can be raised. Therefore, the contact load arising in the contact points due to rotation of the zoom lever 20 can be distributed among the three contact points, thereby preventing the zoom lever 20 from becoming detached, the zoom lever 20 or first holder 30 from breaking, and so on.

For example, referring to FIG. 22, when a load is placed on the zoom lever 20 in the direction indicated by the arrow H in a state where a load is already concentrated on the contact point created by the contact surface 27c and the contact surface 34a, and a line extending from the contact surface 27c and the contact surface 34a passes through the left side of the rotational center shown in FIG. 22, the friction of the contact surfaces relative to the zoom lever 20 works in a downward direction, and thus moving force occurs in the direction indicated by arrow K, relative to the contact surface 27c, and following the sloped contact surface 34a. As a result, the zoom lever 20 moves slightly in the direction indicated by the arrow K, and the contact load increases in the contact point created by the contact surfaces 27b and 34c, and the contact point created by the contact surfaces 27e and 34e, which had low contact loads. Therefore, it is possible to reduce the contact load in the contact point created by the contact surfaces 27c and 34a and as a result, the load can be distributed among the three contact points.

Although not shown in the diagrams, the load can also be distributed among the contact points in the same manner as described above in the case where the zoom lever 20 is rotated in the direction opposite to the arrow H so that the contact surfaces 27a and 34b, 27d and 34f, and 27f and 34d respectively make contact with one another.

[4-2. Operation During Release Manipulation]

When the release button 40 illustrated in FIG. 2 is depressed in the direction of the arrow C, the tip of the protruding portion 41 formed on the bottom surface of the release button 40 pushes down, as shown in FIG. 11, on the operational surface of the release switch 83 illustrated in FIG. 3. An electrical contact point internal to the release switch 83 can be switched to an "on" state and release operations carried out thereby as a result of this depression.

When a user removes his/her finger from the release button 40 after having depressed the release button 40, the release button 40 moves in the direction opposite to the arrow C due to the energizing force of the spring 50. Having moved thus, the movement of the release button 40 due to the exerted force of the spring 50 then is regulated by the flange 44 making contact with the limiting surface 26b formed in the zoom lever 20 (see FIG. 8). Through this, the release button 40 returns to its original position.

[5. Other Configuration of Zoom Lever 20]

Figure 23:
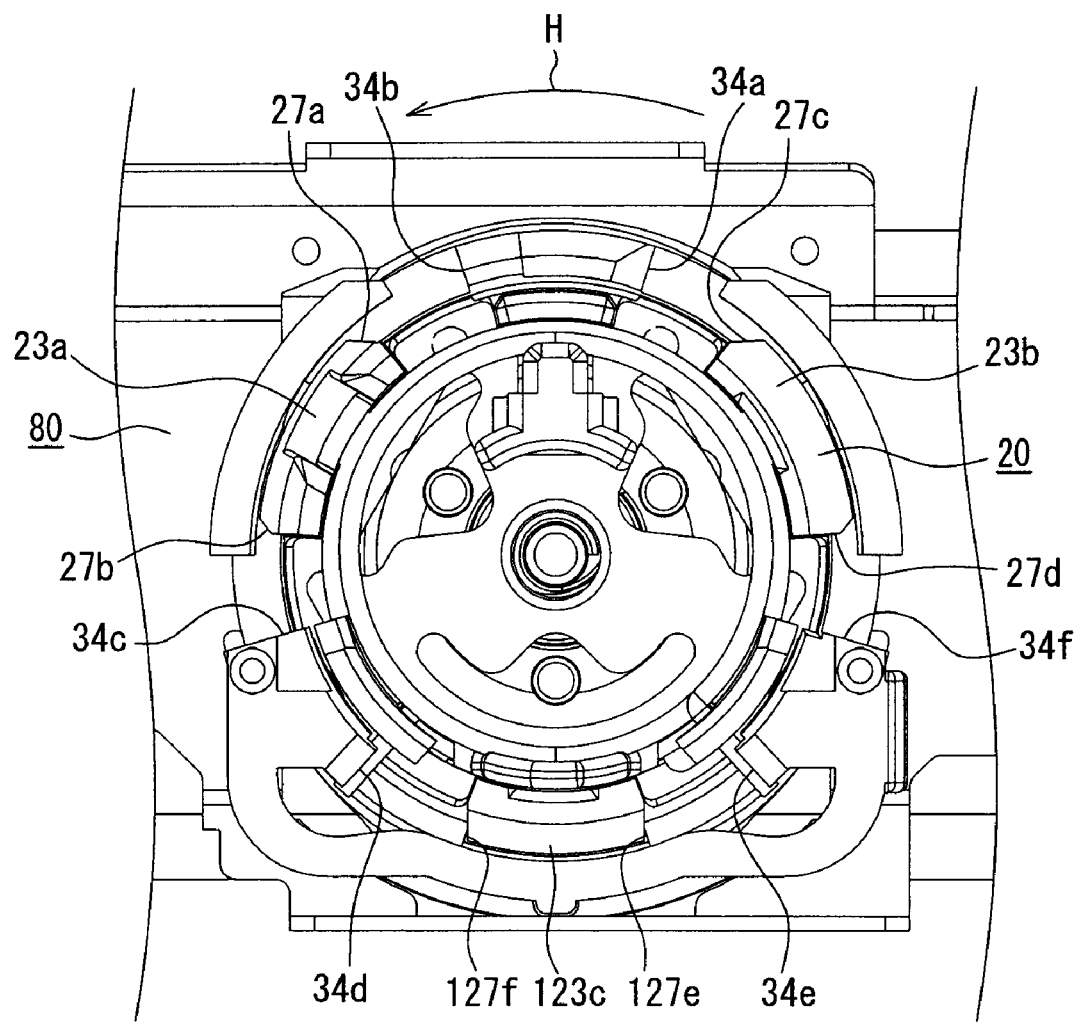
FIG. 23 is a plan view of the relevant parts of an operating device having a different configuration, showing the configuration of the bottom side thereof.
Figure 24:
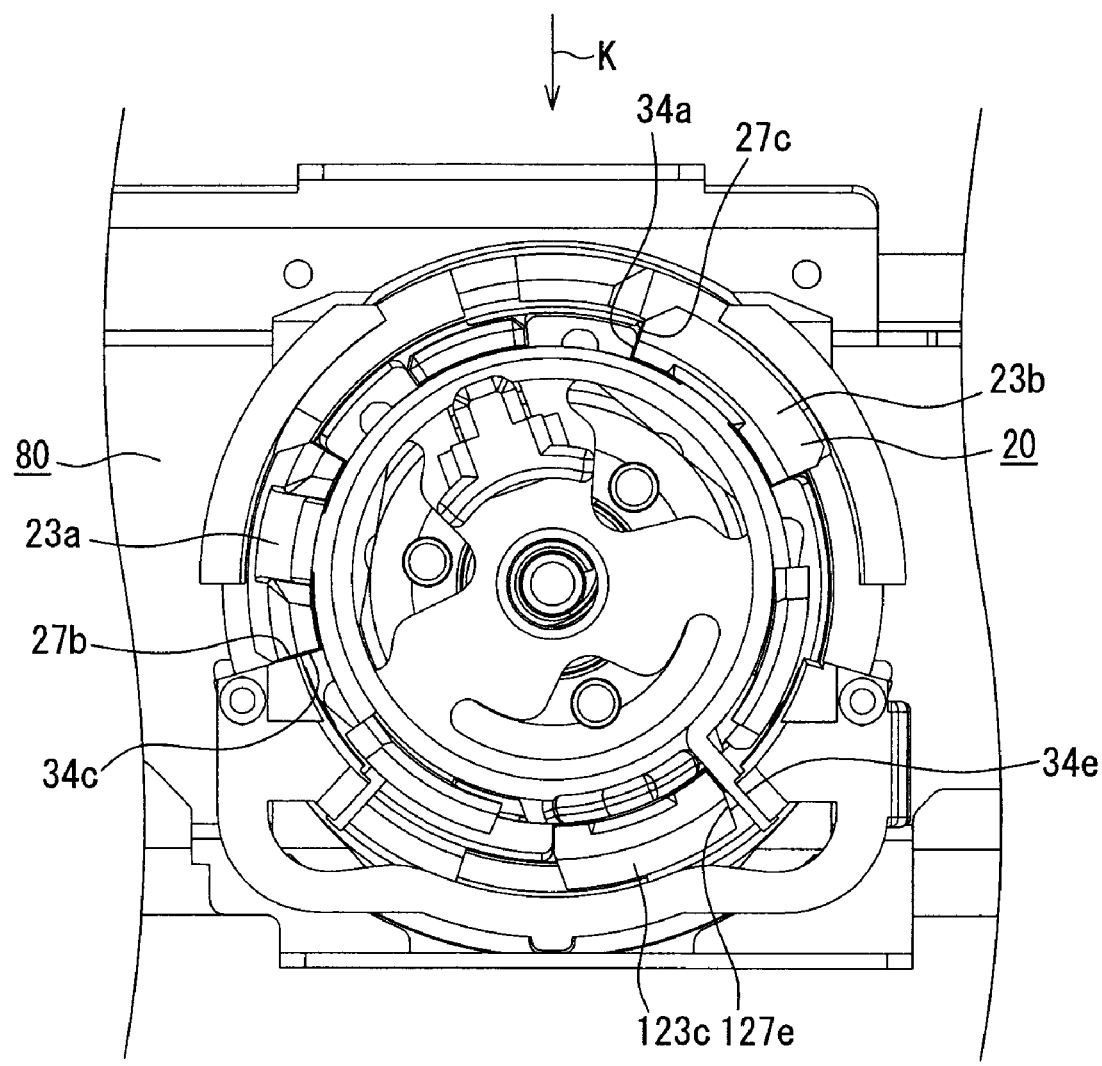
FIG. 24 is a plan view of the relevant parts of an operating device having a different configuration, showing the configuration of the bottom side thereof.

FIGS. 23 and 24 illustrate another exemplary configuration of the zoom lever 20. FIG. 23 illustrates a state in which the zoom lever 20 is in the neutral position. FIG. 24 illustrates a state in which the zoom lever 20 has been rotated to the rotational end in the direction indicated by the arrow H (equivalent to the direction of the arrow B in FIG. 2). In FIGS. 23 and 24, constituent elements identical to those illustrated in FIGS. 21 and 22 shall be given identical reference numerals, and descriptions thereof shall be omitted.

The differences in the configuration shown in FIGS. 23 and 24 with that shown in FIGS. 21 and 22 is that the support portion 23c shown in FIGS. 21 and 22 has been shortened in the lengthwise direction. Accordingly, when the zoom lever 20 is rotated to the rotational end, a contact surface 127e in the zoom lever 20 and the contact surface 34e in the first holder 30 do not make contact with one another, and furthermore, a contact surface 127*f* in the zoom lever 20 and the contact surface 34*d* in the first holder 30 do not make contact with one another In other words, when the zoom lever 20 is rotated in the direction indicated by the arrow H from the state shown in FIG. 23 and reaches the rotational end as shown in FIG. 24, the contact surfaces 27*c* and 34*a* make contact with one another, and the contact surfaces 27*b* and 34*c* make contact with one another, but the contact surfaces 127*e* and 34*e* do not make contact with one another. In other words, there are only two contact points. In such a configuration, the zoom lever 20 can be caused to undergo moving force in the direction indicated by the arrow K, even if the contact load is concentrated on one contact point. Accordingly, the contact load can be increased on the other contact points, making it possible to effectively distribute the load exerted on the two contact points.

The same effect as when three contact points are provided thus can be obtained.

[6. Effects of the Embodiment, Etc.]

According to the present embodiment, contact points between the zoom lever 20 and the first holder 30 are provided in three places, and thus when the zoom lever 20 is rotated, the load exerted on the contact surfaces 27*a* through 27*f* and the contact surfaces 34*a* through 34*f* can be distributed, thereby preventing parts such as the zoom lever 20, the first holder 30, and so on from becoming detached, breaking, or the like.

Furthermore, by forming the contact surfaces 27*a* through 27*f* and the contact surfaces 34*a* through 34*f* in a slightly sloped shape so that a line extending from the surfaces toward the rotational center of the zoom lever 20 does not pass through the rotational center of the zoom lever 20, when a further load is placed on the contact surfaces that are in a state in which they are already making contact with one another, the zoom lever 20 can be displaced in the direction parallel to the surface of the upper cover 10. Accordingly, the load placed on the contact surfaces 27*a* through 27*f* and the contact surfaces 34*a* through 34*f* can be distributed, and thus parts such as the zoom lever 20 and the first holder 30 can be prevented from becoming detached, breaking, and so on.

In addition, the configuration is such that when the pre-prepared member 90 is mounted to the zoom lever 20, the end parts 71 and 72 of the return spring 70 are guided by the sloped surfaces 37*a* and 38*a* formed on the holding portions 37 and 38; as a result, the end parts 71 and 72 easily can be held by the first holder 30 without sacrificing the ease of mounting the pre-prepared member 90 to the zoom lever 20.

Moreover, the return spring 70 undergoes elastic deformation when it is in position 70*c* because the dimension d3, found when the end parts 71 and 72 are being held by the holding surfaces 37*c* and 38*c*, fulfils the relationship shown above in Equation 1. Due to the elastic deformation of the return spring 70, the return spring 70 applies pre-tension to the zoom lever 20, which eliminates wobbling between the zoom lever 20 and the first holder 30. Therefore, when the zoom lever 20 is in the neutral position, wobbles of the zoom lever 20 in the rotational direction can be suppressed, therefore improving the operability of the zoom lever 20 and also preventing the occurrence of noises arising due to the zoom lever 20 making contact with the first holder 30.

In addition, because the limiting surfaces 37*d* and 38*d* are formed, the end parts 71 and 72 will not easily become detached once they have been mounted.

When mass-producing the operating device or devices provided therewith, the ease of assembly can be improved by separately creating the pre-prepared member 90, as illustrated in FIG. 13, in advance. In other words, the configuration has the return spring 70 first mounted on the second holder 60 through a simple operation, thus creating the pre-prepared member 90, before the return spring 70 is incorporated into the zoom lever 20; then, the pre-prepared member 90 is mounted on the zoom lever 20. This greatly improves the workability of the assembly process. Furthermore, the second holder 60 is in a simple form and is configured so that the return spring 70 can be mounted with ease, and thus the pre-prepared member 90 can also be created with ease.

Furthermore, forming the contact surfaces 27*a* through 27*f* and the contact surfaces 34*a* through 34*f* of a resin, a larger contact surface area can be secured for both, and thus when a contact load is placed thereupon, that load can be distributed in the direction parallel to the surface.

It should be noted that the release button 40 is not necessary; and that the same effects can be obtained in an operating device provided only with a rotatable operating member (the zoom lever 20, in the present embodiment). Omitting the release button 40 also means that the spring 50, the hole portions 65 formed in the second holder 60, and so on are not necessary.

The operating device according to the present invention is useful in portable electronic devices such as mobile telephone terminals, digital still cameras, and the like, but is useful in devices that include at least a rotatable operating member.

[Note 1]

The operating device according to the present invention is provided with a rotational operating member that can be rotated within a predetermined angular range, and comprises: a first holder that holds the rotational operating member so as to be rotatable; an elastic member that energizes the rotational operating member in the rotation direction; and a second holder that holds the elastic member and is held within the rotational operating member, wherein the first holder supports the elastic member while causing the elastic member to undergo elastic deformation.

According to the present invention, the load placed upon contact surfaces during operation can be distributed among plural contact surfaces, thereby preventing the rotational operating member, first holder, and so on from breaking, becoming detached, and so on.

It should be noted that the first holder 30 according to the present embodiment is an example of the first holder of the present invention, and the second holder 60 according to the present embodiment is an example of the second holder of the present invention. Moreover, the zoom lever 20 according to the present embodiment is an example of the rotational operating member of the present invention. Furthermore, the return spring 70 according to the present embodiment is an example of the elastic member of the present invention.

[Note 2]

The operating device of the present invention can be configured so that the elastic member is configured of a coil spring, the first holder includes holding portions that hold the ends of the wire of which the coil spring is configured, and the coil spring is disposed in the second holder so that the center axis of the coiled part and the rotational axis of the rotational operating member are approximately parallel. With such a configuration, when the second holder that holds the coil spring is held by the first holder, the ends of the wire of which the coil spring is configured are held by the holding portions of the first holder, making it possible to improve the strength with which the first and second holders can be coupled to one another.

It should be noted that the return spring 70 according to the present embodiment is an example of the coil spring of the present invention. Moreover, the holding portions 37 and 38 according to the present embodiment are examples of the holding portions of the present invention.

[Note 3]

Furthermore, the configuration can be such that the holding portions include limiting surfaces by which the movement of the ends of the wire in the central axis direction of the coiled part is limited. Such a configuration makes it possible to prevent the coil spring that is mounted on the holding portions from becoming detached from the holding portions, and thus the coil spring can be mounted with certainty.

It should be noted that the limiting surfaces 37*d* and 38*d* of the present embodiment are examples of the limiting surfaces of the present invention.

[Note 4]

Furthermore, the configuration can be such that the holding portions have sloped surfaces in their ends on the side of the central axis of the coiled part. With such a configuration, when mounting the second holder, which holds the coil spring, to the rotational operating member, parts of the coil spring can be guided along the sloped surface and mounted on the holding portions while undergoing elastic deformation. This makes it possible to mount the coil spring with ease.

It should be noted that the sloped surfaces 37*a* and 38*a* of the present embodiment are examples of the sloped surfaces of the present invention.

[Note 5]

The configuration can be such that the first holder has first contact surfaces that limit the rotational operating member so as to be rotatable within the predetermined angular range; and the first contact surfaces are formed at plural points in the rotational direction of the rotational operating member, and are formed so that lines extended in the direction of the surface from the first contact surfaces do not pass through the rotational center of the rotational operating member. With such a configuration, the load placed on the contact surfaces at the time of rotation can be distributed, thus making it possible to prevent parts such as the rotational operating member, the first holder, and so on from becoming detached, breaking, or the like.

It should be noted that the contact surfaces 34*a*, 34*b*, 34*c*, 34*d*, 34*e*, and 34*f* of the present embodiment are examples of the first contact surfaces of the present invention.

[Note 6]

The configuration can be such that the rotational operating member has second contact surfaces capable of making contact with the first contact surfaces; and the first contact surfaces and second contact surfaces are formed of resin. Such a configuration makes it possible to secure a larger contact surface area.

It should be noted that the contact surfaces 27*a*, 27*b*, 27*c*, 27*d*, 27*e*, and 27*f* of the present embodiment are examples of the second contact surfaces of the present invention.

[Note 7]

In a manufacture method for assembling an operating device and mounting the operating device in a device according to the present invention, the operating device comprises a rotational operating member that can be rotated within a predetermined angular range, a first holder that holds the rotational operating member so as to be rotatable, an elastic member that energizes the rotational operating member in the rotation direction, and a second holder that holds the elastic member and is held within the rotational operating member; and the manufacture method comprises the steps of creating a pre-prepared member by causing the elastic member to be held by the second holder, mounting the first holder to the device, mounting the rotational operating member to the first holder, and mounting the pre-prepared member to the rotational operating member, wherein part of the elastic member is mounted to the first holder when mounting the pre-prepared member to the rotational operating member.

Furthermore, the elastic member easily can be incorporated into the rotational operating member, improving the ease of assembly.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An operating device provided with a rotational operating member that can be rotated within a predetermined angular range, the device comprising:
   a first holder that holds the rotational operating member so as to be rotatable;
   an elastic member that energizes the rotational operating member in the rotation direction; and
   a second holder that holds the elastic member and is held within the rotational operating member,
   wherein the first holder supports the elastic member while causing the elastic member to undergo elastic deformation.

2. The operating device according to claim 1,
   wherein the elastic member is configured of a coil spring;
   the first holder includes holding portions that hold the ends of the wire of which the coil spring is configured; and
   the coil spring is disposed in the second holder so that the center axis of a coiled part and the rotational axis of the rotational operating member are approximately parallel.

3. The operating device according to claim 2, wherein the holding portions have limiting surfaces by which the movement of the ends of the wire in the central axis direction of the coiled part is limited.

4. The operating device according to claim 2, wherein the holding portions have sloped surfaces in their ends on the side of the central axis of the coiled part.

5. The operating device according to claim 1,
   wherein the first holder has first contact surfaces that limit the rotational operating member so as to be rotatable within the predetermined angular range; and
   the first contact surfaces are formed at plural points in the rotational direction of the rotational operating member, and are formed so that lines extended in the direction of the surface from the first contact surfaces do not pass through the rotational center of the rotational operating member.

6. The operating device according to claim 5,
   wherein the rotational operating member has second contact surfaces capable of making contact with the first contact surfaces; and
   the first contact surfaces and second contact surfaces are formed of resin.

7. A manufacture method for assembling an operating device and mounting the operating device in a device, the operating device comprising:
   a rotational operating member that can be rotated within a predetermined angular range;
   a first holder that holds the rotational operating member so as to be rotatable;
   an elastic member that energizes the rotational operating member in the rotation direction; and a second holder that holds the elastic member and is held within the rotational operating member, and the manufacture method comprising the steps of creating a pre-prepared member by causing the elastic member to be held by the second holder;

mounting the first holder to the device;

mounting the rotational operating member to the first holder; and mounting the pre-prepared member to the rotational operating member, wherein part of the elastic member is mounted to the first holder when mounting the pre-prepared member to the rotational operating member.

* * * * *